United States Patent [19]

Kuriyama et al.

[11] Patent Number: 5,505,675

[45] Date of Patent: Apr. 9, 1996

[54] HYDRAULIC CONTROL SYSTEM OF AUTOMATIC TRANSMISSION

[75] Inventors: Minoru Kuriyama, Higashi-Hiroshima; Kazuo Sasaki, Hiroshima; Tetsuro Takaba, Kure; Tetsuya Nishizato, Hatsukaichi; Takashi Ueno, Higashi-Hiroshima, all of Japan

[73] Assignee: Mazda Motor Corporation, Hiroshima, Japan

[21] Appl. No.: 346,171

[22] Filed: Nov. 21, 1994

[30] Foreign Application Priority Data

Nov. 22, 1993 [JP] Japan ................................. 5-291800
Apr. 22, 1994 [JP] Japan ................................. 6-107569
Aug. 1, 1994 [JP] Japan ................................. 6-179928

[51] Int. Cl.[6] ................................................. F16H 61/26
[52] U.S. Cl. ......................... 477/156; 477/143; 477/158; 477/902
[58] Field of Search ......................... 477/143, 144, 477/148, 154, 155, 156, 158, 159, 902

[56] References Cited

U.S. PATENT DOCUMENTS

| | | | |
|---|---|---|---|
| 4,733,580 | 3/1988 | Kubo et al. | 477/129 |
| 4,922,424 | 5/1990 | Hiramatsu | 477/155 X |
| 5,103,694 | 4/1992 | Kobayashi et al. | 477/160 X |
| 5,131,294 | 7/1992 | Yoshimura | 477/158 X |
| 5,267,491 | 12/1993 | Sumimoto et al. | 477/155 |
| 5,295,415 | 3/1994 | Abe et al. | 477/109 X |

FOREIGN PATENT DOCUMENTS 3-249469 11/1991 Japan.
3-249466 11/1991 Japan.
3-249468 11/1991 Japan.
4-72099 11/1992 Japan.

*Primary Examiner*—Charles A. Marmor
*Assistant Examiner*—Peter Kwon
*Attorney, Agent, or Firm*—Keck, Mahin & Cate

[57] ABSTRACT

A hydraulic control system for a power train including a shift speed mechanism, a frictional element for switching a shift characteristic of the shift speed mechanism, a hydraulic control mechanism for controlling a hydraulic pressure, a target shift time setting device for setting a target shift time based on an input speed difference of the shift speed mechanism through the shift operation and an input torque introduced to the shift speed mechanism, an angular acceleration calculator for calculating an angular acceleration of an input member of the shift speed mechanism based on the target shift time obtained through the target shift time setting device and the input speed change of the shift speed mechanism through the shift operation, an inertia hydraulic pressure setting device for setting an inertia hydraulic pressure for coping with a moment force due to a moment of inertia of a power transmitting system to the shift speed mechanism based on the angular acceleration of the input member of the shift speed mechanism obtained through the angular acceleration calculator, an input torque pressure setting device for setting an input torque hydraulic pressure corresponding to the input torque introduced to the shift speed mechanism based on the input torque and, a target pressure setting device for setting a final target hydraulic pressure for the hydraulic control mechanism based on the inertia hydraulic pressure and the input torque hydraulic pressure. The shift shock is effectively suppressed.

15 Claims, 28 Drawing Sheets

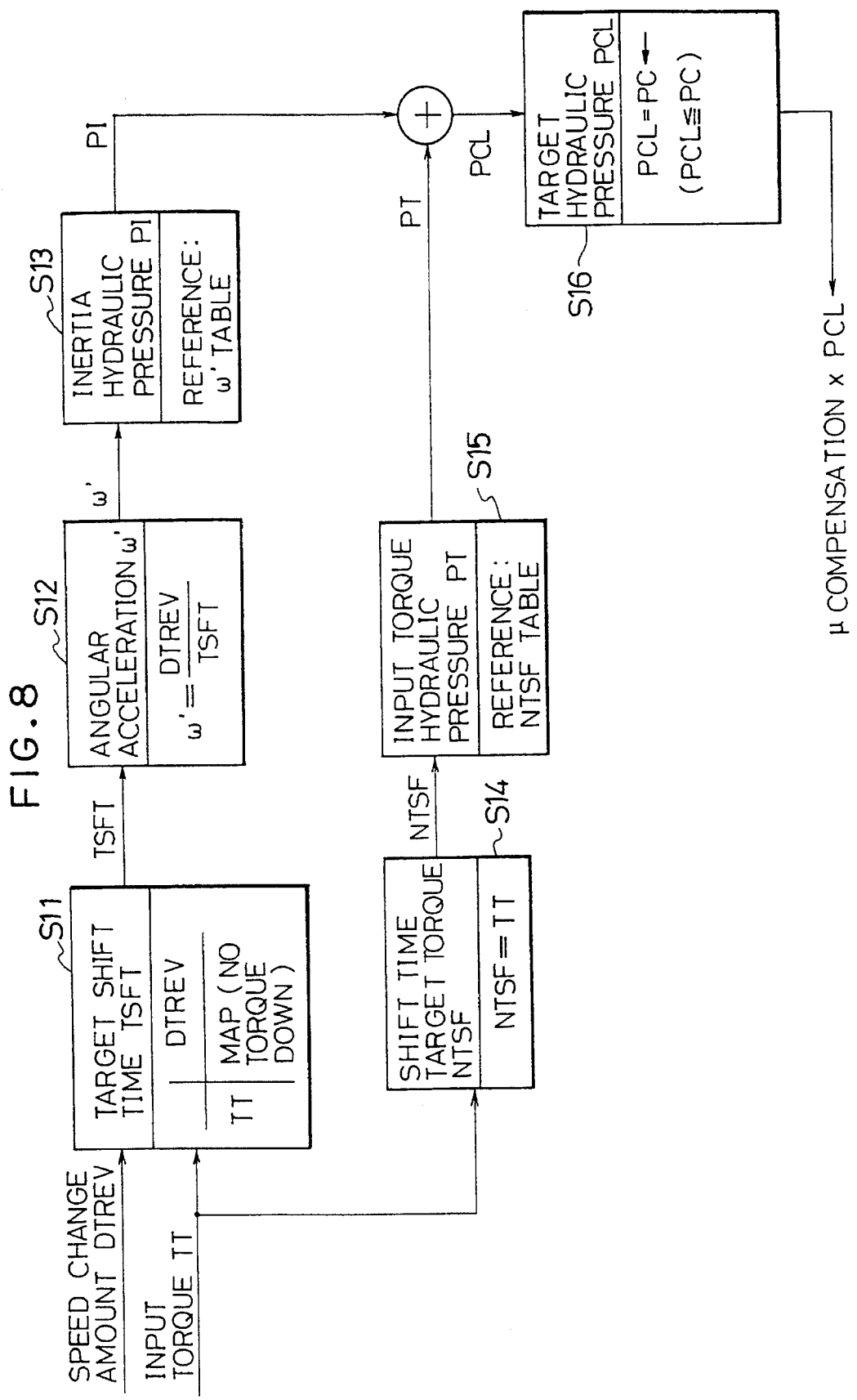

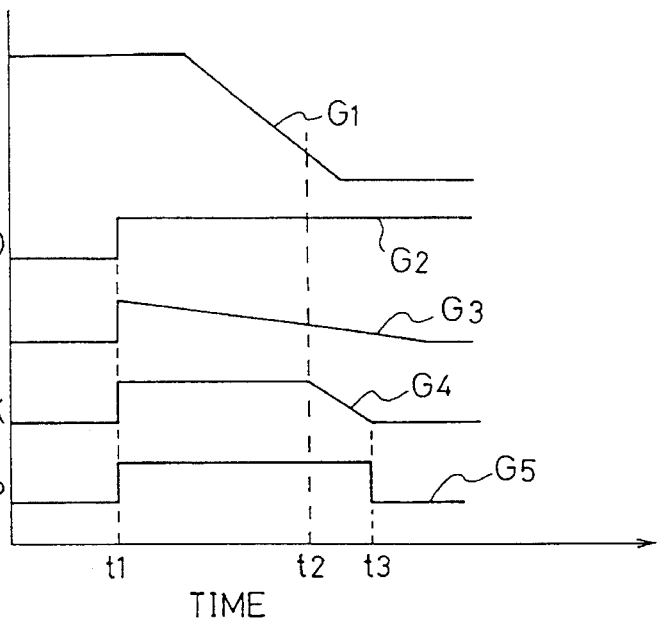
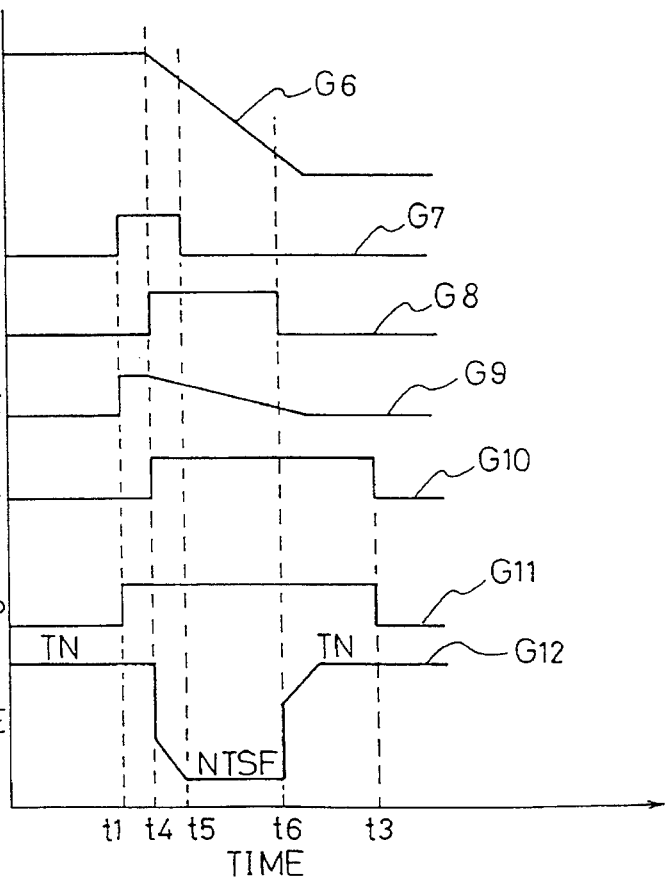

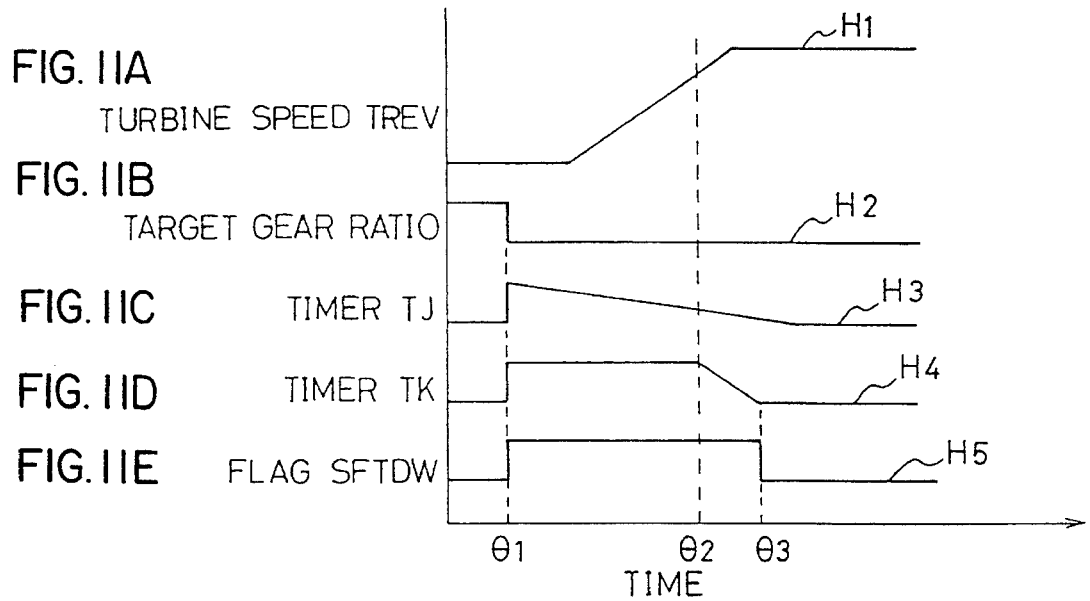
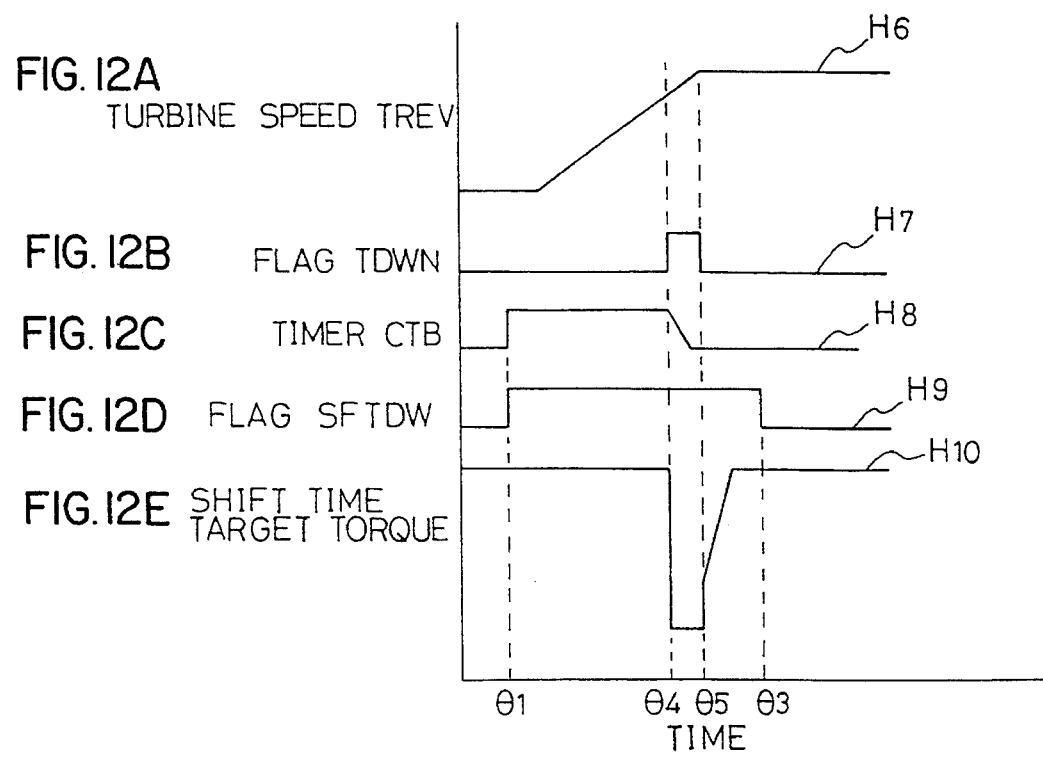

HYDRAULIC CONTROL SYSTEM OF AUTOMATIC TRANSMISSION

BACKGROUND OF THE INVENTION

1. Field of the Invention

The present invention relates to a hydraulic control system of an automatic transmission.

2. Related Art

Generally, an automatic transmission for an automotive vehicle is provided with a torque converter and a shift speed mechanism. The torque converter converts a torque produced by a crank shaft or an engine torque and transmits an engine output torque to a turbine shaft as a turbine torque. The shift speed mechanism mechanically converts the turbine torque and introduces an output shaft. Meanwhile, the shift speed mechanism is, generally, provided with a planetary gear mechanism having a plurality of gears such as a sun gear, ring gear, pinion gear and the like and employed to switch a power transmitting path in its shift operation and thus switches shift characteristics (shift stage, shift ratio).

In order to change the power transmitting path or to change the shift characteristics of the shift speed mechanism, the automatic transmission is provided with a number of hydraulic frictional elements, such as clutches for switching on a gear (transmission of the torque) or off a gear(interruption of the transmission of the torque ), brakes for braking on a gear (engage) or off (release) and the like. The hydraulic mechanism switches the on-off pattern of the respective frictional elements to thereby switch the shift characteristics of the shift speed mechanism.

In such an automatic transmission, an engaging force of the frictional element is substantially proportional to a line pressure or basic supply pressure. In a shift operation, the engaging pressure of the frictional elements, in other words, the line pressure of the hydraulic mechanism must have an appropriate value in accordance with a torque amount transmitted through the frictional element. If the unduly high value of the line pressure incurs a power loss as well as an undesirable shift shock. Conversely, the unduly low line pressure extends a time period for the shift operation resulting in a deterioration of the running performance of the vehicle. The line pressure must have an appropriate value at a normal condition other than the shift condition as well in accordance with the torque amount transmitted through the shift speed mechanism. As mentioned above, if the line pressure is too high, the power loss is increased. And, if the line pressure is too low, the frictional element produces a slip therebetween so that an engaging portion of the frictional element is undesirably worn and heated.

In view of this, the conventional automatic transmission usually controls the line pressure in accordance with the turbine torque which is an input torque from the torque converter to the shift speed mechanism. However, it is difficult to directly detect the turbine torque or a torque of the turbine shaft. Therefore, conventionally, an engine output torque or crank shaft torque is computed based on the ignition timing and the like, then engine torque is multiplied by the torque ratio of the torque converter to compute the turbine torque. Meanwhile, the torque ratio of the torque converter can be easily calculated by a ratio of the turbine shaft rotation speed to the crank shaft rotation speed or a speed ratio.

The turbine shaft speed, in other words, the input member speed of the shift speed mechanism changes during the shift operation. Therefore, a moment force derivable from a moment of inertia of the power transmitting system from the engine to the shift speed mechanism acts on the frictional element due to the change of the input member speed. Thus, the torque amount transmitted through the frictional element is a sum of the input torque of the shift speed mechanism and the moment force of the power transmitting system. Specifically, in case of an up shift operation, the input member speed is reduced so that the moment force acts on the frictional element in the same direction as the turbine shaft torque. Conversely, in case of a down shift operation, the input member speed is increased to that the moment force acts on the opposite direction to the turbine shaft torque.

Meanwhile, the moment force is a product of the moment of inertia and an angular acceleration of a shaft.

Thus, the frictional element is subjected to the moment force as well as the turbine torque so that the optimized line pressure cannot be determined in the shift condition based solely on the input torque introduced into the shift speed mechanism. In view of this, it has been proposed that a hydraulic control device determines the line pressure based on the input torque to the shift gear mechanism and the input speed thereto (see for example Japanese patent publication 4-72099 published in 1992 for opposition).

It should however be noted that the conventional hydraulic control system for the automatic transmission as disclosed in the Japanese patent publication No. 4-72099 in which the line pressure is determined based on the input torque and input speed to the shift gear system is disadvantageous in that the system cannot estimate accurately the moment force acting on the frictional element during the shift condition. In the up-shift operation, the output torque of the shift speed mechanism is temporarily increased due to the moment force so that a torque shock is produced. In order to suppress the increase the output torque, the shift operation time period is necessary to be extended so that the running performance during the shift operation is deteriorated.

SUMMARY OF THE INVENTION

It is therefore an object of the present invention to provide the optimized line pressure for the hydraulic control system of the automatic transmission during the shift operation.

It is another object of the present invention to provide a hydraulic control system for the automatic transmission which can reduce the shift time and effectively prevent the shift shock.

The above and other objects of the invention can be accomplished by a hydraulic control system for a power train comprising a shift speed mechanism, a frictional element hydraulically controlled for switching a shift characteristic of the shift speed mechanism, a hydraulic control mechanism for controlling a hydraulic pressure of the frictional element, a target shift time setting device for setting a target shift time based on an input speed difference of the shift speed mechanism through the shift operation and an input torque introduced to the shift speed mechanism, an angular acceleration calculator for calculating an angular acceleration of an input member of the shift speed mechanism based on the target shift time obtained through the target shift time setting device and the input speed change of the shift speed mechanism through the shift operation, an inertia hydraulic pressure setting device for setting an inertia hydraulic pressure for coping with a moment force due to a moment of inertia of a power transmitting system to the shift speed mechanism based on the angular acceleration of the input member of the shift speed mechanism obtained through the angular acceleration calculator, an input torque pressure setting device for setting an input torque hydraulic pressure corresponding to the input torque introduced to the shift speed mechanism based on the input torque and a target pressure setting device for setting a final target hydraulic pressure for the hydraulic control mechanism as a working hydraulic pressure based on the inertia hydraulic pressure set by the inertia pressure setting device and the input torque hydraulic pressure set by the input torque pressure setting device.

According to another aspect of the present invention, there is further provided a target torque setting device for setting a target input torque to the shift speed mechanism during the shift operation based on the angular acceleration of the input member calculated by the angular acceleration calculator and the input torque of the shift speed mechanism. The input torque pressure setting device sets the input torque hydraulic pressure based on the target torque set by the target torque setting device.

Preferably, the target shift time setting device sets the target shift time by searching a target shift time map based on the input speed change to the shift speed mechanism through the shift operation and the input torque introduced to the shift speed mechanism. In this case, two kinds of target shift time maps, one used for a hydraulic control where a torque down is produced in the shift speed mechanism in the shift operation and the other used for a hydraulic control where the torque down is not produced in the shift speed mechanism in the shift operation, are separately provided.

In another feature of the preset invention, an engine torque control device is provided for controlling the input torque to the target input torque set by the target torque setting device. The target pressure setting device sets the working hydraulic pressure of the hydraulic control mechanism during shift operation based on a smaller value of an actual input torque and the target input torque.

More specifically, the hydraulic pressure setting device sets the working hydraulic pressure at a value corresponding to the target input torque when the actual input torque is greater than the target input torque during the shift operation, and sets at a value corresponding to the actual input torque when the target input torque is greater than the actual input torque.

The input torque is determined by a parameter including at least an intake air amount of an engine. The engine torque control device controls to fix the engine torque at a predetermined value corresponding to the target input torque when the actual input torque is greater than the target input torque in an inertial phase of the shift operation. The speed change of the input member of the shift speed mechanism through the shift operation when the shift operation is completed within the target shift time is used as a factor representing an inertia torque which acts on the frictional element during the shift operation.

Preferably, the hydraulic control system may further includes a target shift time change device for changing the target shift time in accordance with the actual input torque during the shift operation and, an inertia hydraulic pressure change device for reducing the inertia hydraulic pressure as the target shift time is increased.

In another feature of the present invention, the hydraulic control further includes a frictional coefficient inference device for inferring a frictional coefficient of the frictional element during the shift operation. The frictional element is subjected to a hydraulic control by the hydraulic control mechanism during the shift operation.

The target pressure setting device sets the working hydraulic pressure based on the input torque, a speed change rate of the shift speed mechanism during the shift operation and an inferred frictional coefficient inferred by the frictional coefficient inferring device. The frictional coefficient inference device infers the frictional coefficient based on at least one of a surface pressure and a relative speed difference between a driving member and driven member of the frictional element.

Preferably, the target pressure setting device sets the target hydraulic pressure in accordance with a primary approximate formula including the input torque to the shift speed mechanism and input speed change rate of the shift speed mechanism during the shift operation as independent variables and a constant obtainable from the frictional coefficient of the frictional element. The primary approximate formula is as follow;

$$P=a1*TT+a2*w'+a3*Tt*w'+a4$$

wherein

P: target hydraulic pressure,

TT: input torque to the shift speed mechanism, w': rotation speed change rate of an input member of the shift speed mechanism, a1, a2, a3 and a4: constants obtainable from the frictional coefficient of the frictional element.

Alternatively, the target pressure setting device may set the target hydraulic pressure in accordance with a secondary approximate formula including the input torque to the shift speed mechanism and input speed change rate of the shift speed mechanism during the shift operation as independent variables and a constant obtainable from the frictional coefficient of the frictional element. The secondary approximate formula is as follow;

$$P=b1*TT+b2*w'+b3*Tt*w'+b4*TT^2+b5*w'^2+b6*TT^2*w'+b7*TT*w'^2+b8*w'^2+b9$$

wherein

P: target hydraulic pressure,

TT: input torque to the shift speed mechanism, w: rotation speed change rate of an input member of the shift speed mechanism, b1, b2, b3, b4, b5, b6, b7, b8 and b9: constants obtainable from the frictional coefficient of the frictional element.

Further objects, features and advantages of the present invention will become apparent from the Detailed Description of Preferred Embodiments which follows when read in light of the accompanying Figures.

BRIEF DESCRIPTION OF THE DRAWINGS

FIG. 8 is a block chart showing a relationship of procedures in the line pressure control where the torque down control is not carried out;

FIG. 9 is a time chart showing changes of turbine speed, target gear ratio, flag values in a shift up operation;

FIG. 10 is a time chart showing changes of turbine speed, target engine torque, flag values and timer values in a shift up operation;

FIG. 11 is a time chart showing changes of turbine speed, target gear ratio, flag values in a shift down operation;

FIG. 12 is a time chart showing changes of .turbine speed, target engine torque, flag values and timer values in a shift down operation;

DETAILED DESCRIPTION OF THE PREFERRED EMBODIMENTS

Figure 1:
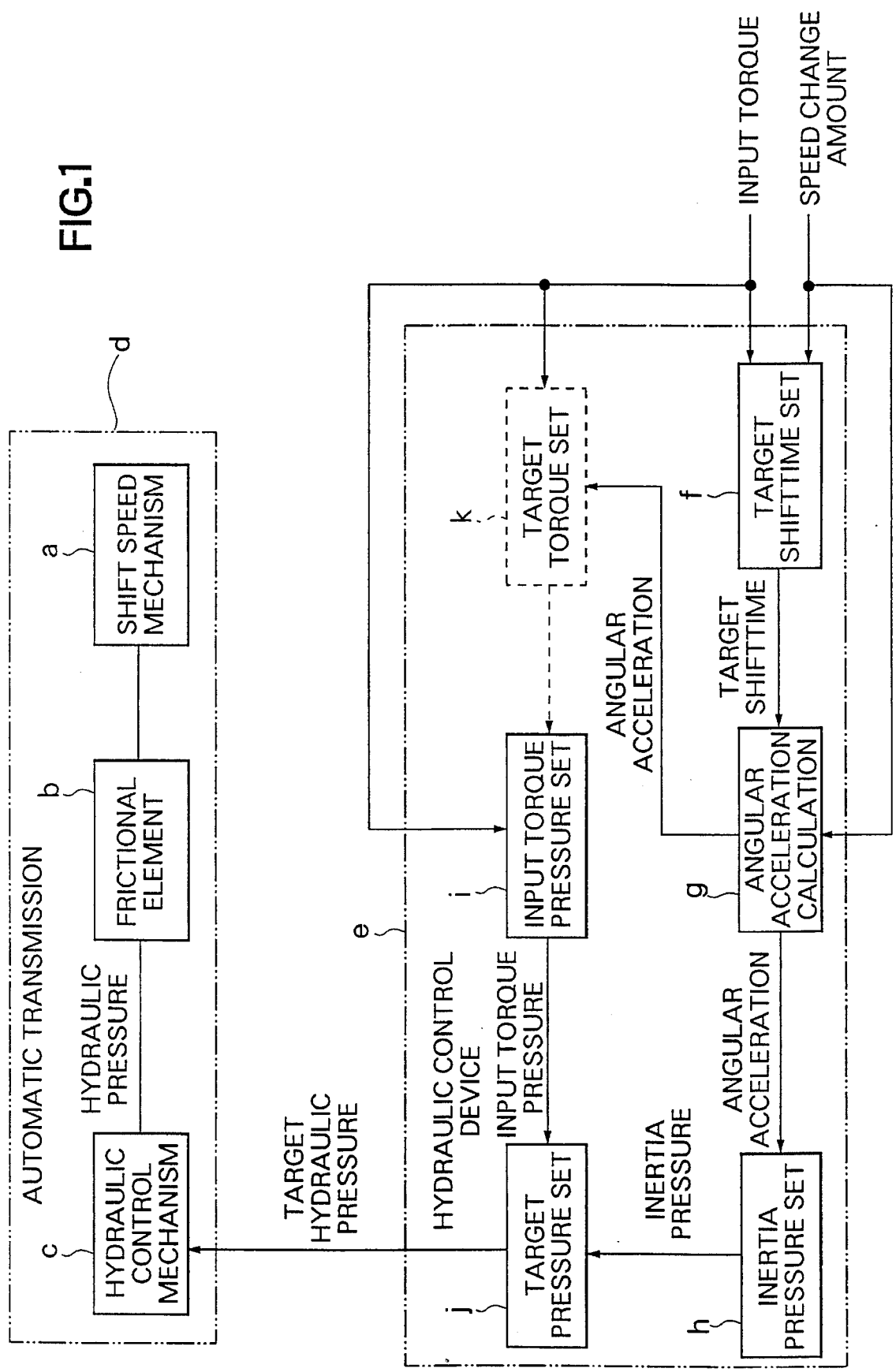
FIG. 1 is a schematic block diagram showing features of the present invention.

FIG. 1 shows elements of the invention. Referring to FIG. 1, a hydraulic control system e for an automatic transmission d includes a shift speed mechanism a, a frictional element b hydraulically controlled for switching a shift characteristic of the shift speed mechanism, a hydraulic control mechanism c for controlling a hydraulic pressure of the frictional element b, target shift time setting device f for setting a target shift time based on an input speed difference of the shit speed mechanism through the shift operation and an input torque introduced to the shift speed mechanism, angular acceleration calculator g for calculating an angular acceleration of an input member of the shift speed mechanism a based on the target shift time obtained through the target shift time setting device f and the input speed difference of the shift speed mechanism a through the shift operation, inertia hydraulic pressure setting device h for setting an inertia pressure for responding to a moment force due to a moment of inertia of a power transmitting system to the shift speed mechanism a based on the angular acceleration of the input member of the shift speed mechanism a obtained through the angular acceleration calculator g, input torque pressure setting device i for setting an input torque hydraulic pressure corresponding to the input torque of the shift speed mechanism a based on the input torque, and target pressure setting device for setting a final target hydraulic pressure for the hydraulic control mechanism c based on the inertia hydraulic pressure set by the inertia pressure setting device h and the input torque hydraulic pressure set by the input torque pressure setting device i.

According to another aspect of the present invention, in the hydraulic control device e of the automatic transmission d, there is provided a target torque setting device k for setting a target torque during the shift operation based on the angular acceleration of the input member calculated by the angular acceleration calculator g and the input torque of the shift speed mechanism a. The input torque pressure setting device i sets the input torque hydraulic pressure based on the target torque set by the target torque setting device k.

According to further aspect of the present invention, in the hydraulic control device e for the automatic transmission d, the target shift time setting device f sets the target shift time by searching a target shift time map based on the input speed difference of the shift speed mechanism a through the shift operation and the input torque introduced to the shift speed mechanism a. The two maps, one for a case where a torque down is produced in the shift speed mechanism in the shift operation and another for a case where the torque down is not produced in the shift speed mechanism in the shift operation, are separately provided.

Figure 2:
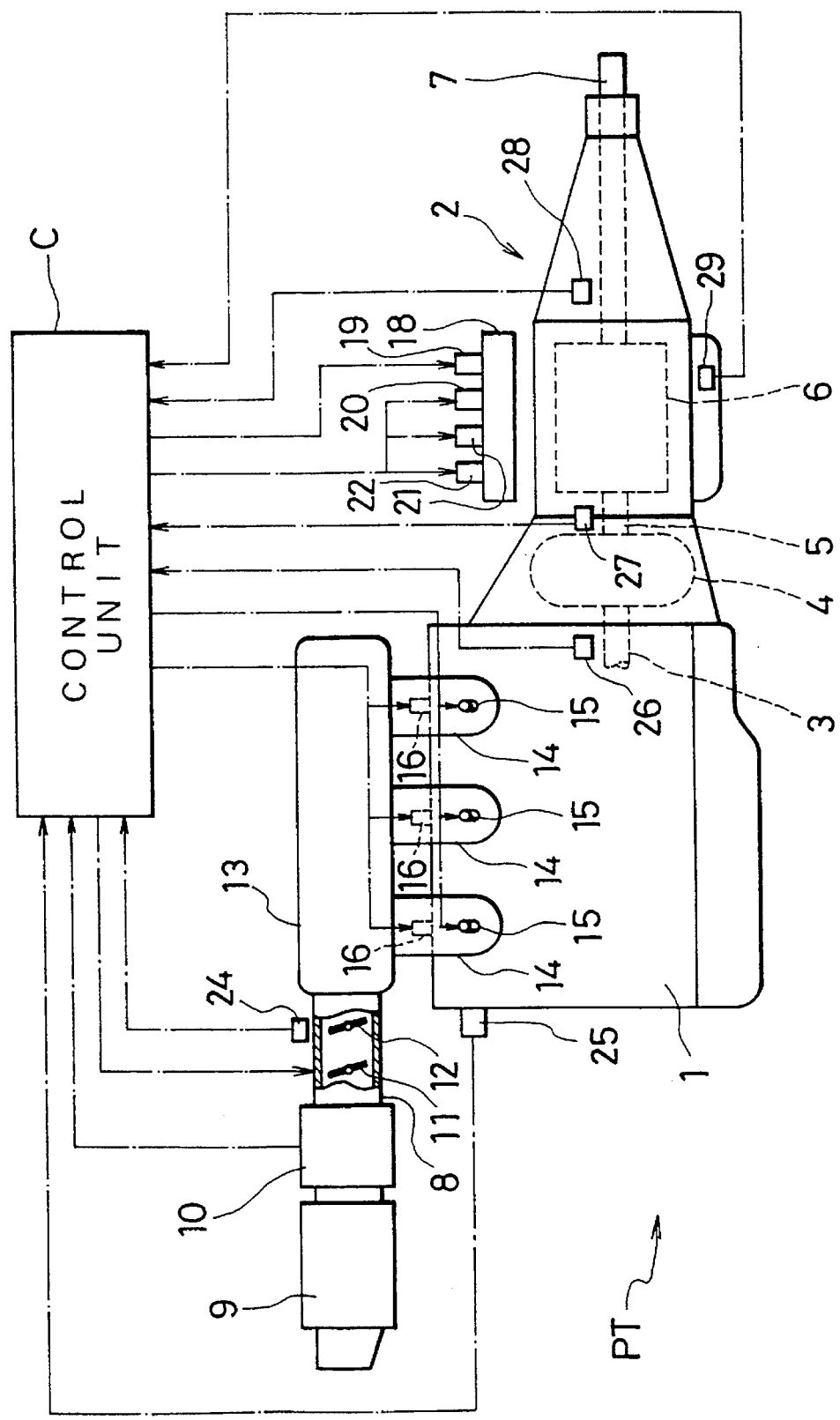
FIG. 2 is a schematic view of a power train provided with a hydraulic control system in accordance with the present invention.

As shown in FIG. 2, a power train PT for an automobile including a multiple cylinder engine 1 which produces an engine torque taking advantage of the fuel burning energy, an automatic transmission 2 which automatically shifts speed in accordance with operating condition. The power train PT converts an output torque of an engine 1 or a torque of a crank shaft 3 to a turbine torque of a turbine shaft 5 by a torque converter 4 and further converts the turbine torque by means of a shift speed mechanism 6 to transmit to an output shaft 7. In order to supply combustion air to the engine 1, there is provided a common intake passage 8 of which tip end is opened to outside air. The common intake passage 8 is provided with, in a flow direction from an upstream to downstream, air cleaner 9 for removing a dust in the air, air flow sensor 10 for detecting intake air amount, electrical throttle valve 11, main throttle valve 12 opened and closed in association with an acceleration pedal (shown) in this order. The downstream end of the common intake passage 8 is connected with surge tank 13 which stabilizes an intake air flow.

An independent intake passage 14 is provided for each of the cylinders. The intake air introduced into the surge tank 13 through the common intake passage 8 is supplied to each of the cylinder through the corresponding independent intake passage 14. A fuel injector 16 is provided in the independent 14 so that the fuel injected from the injector 16 is mixed with the intake air to be supplied to each of the cylinders. An ignition plug 15 is provided in each of the cylinders.

Figure 3:
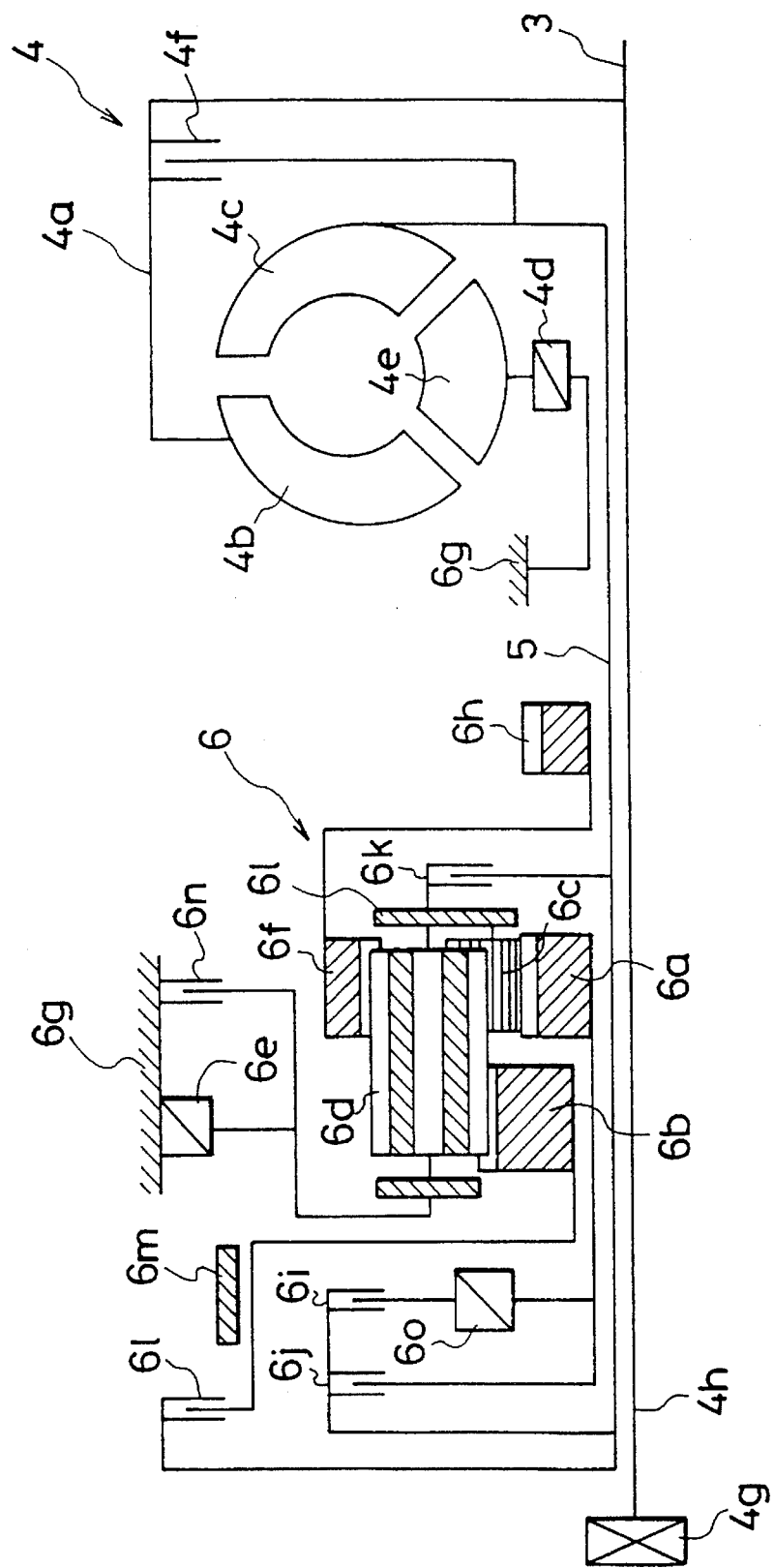
FIG. 3 is a schematic sectional view of an automatic transmission which constitutes a part of the power train of FIG. 1.

Referring further to FIG. 3, an automatic transmission 1 according to the present invention includes a torque converter 4, a shift speed mechanism or transmission gear mechanism 6 driven by an output of the torque converter 4, a plurality of frictional elements 6i–6n, such as clutches and brakes for switching a power transmitting path of the shift speed mechanism 6 and one way clutches 6o and 6p among running ranges D, S, L and R and shift stages 1–4 in the D range, 1–3 in the S range and 1 and 2 in the L range.

The torque converter 4 is provided with a pump 4b integral with a transmission case 4a connected with an output shaft 1 of an engine, a turbine 4c disposed facing the pump 4b and driven thereby through a hydraulic fluid, a stator 4d disposed between the pump 4b and turbine 4c and carried by the converter case 4a through a one way clutch 4d and a lockup clutch 4f for directly connecting the output shaft 5 with the engine output shaft 3 through the converter case 4a. A rotation of the turbine 4c is transmitted to the shift speed mechanism 6 through a turbine shaft 5. To the engine output shaft 3 is connected a pump shaft 4h, which passes through the turbine shaft 5, drives an oil pump 4g which is disposed at a rear end portion of the shift speed mechanism 6.

The shift speed mechanism 6 is constituted by Ravigneaux-type planetary gear mechanism and provided with a a small sun gear 6a arranged over the turbine shaft 5, a large sun gear 6b arranged over the turbine shaft 5 rearward of the small sun gear 6a, a plurality of short pinion gears 6c meshed with the small sun gear 6a, long pinion gear 6d of which rear portion is meshed with the large sun gear 6b, a carrier 6e rotatably supporting the long pinion gear 6d and the short pinion gear 6c and a ring gear 6f meshed with the long pinion gear 6d.

Between the turbine shaft 5 and small sun gear 6a are disposed a forward clutch 6i and a first one way clutch 6o in tandem. A coast clutch 6j is juxtaposed with the clutch 6i and 6o. A 3–4 clutch 6k is disposed between the turbine shaft 5 and the carrier 6e. A reverse clutch 6l is disposed between the turbine shaft 5 and the large sun gear 6b. Between the large sun gear 6b and the reverse clutch 6l is disposed a 2–4 brake 6m of a band brake for fixing the large sun gear 6b. A second one way clutch 6p for receiving a reaction force of the carrier 6e and a low-reverse brake 6n for fixing the carrier 6e. The ring gear 6f is connected with the output gear 6h through which the rotation is transmitted to right and left wheels (not shown).

Explaining a relationship between the operations of the clutches 6o and 6p and the shift stages, in the first stage, the forward clutch 6i is engaged and the first and second one way clutches 6o and 6p are locked. As a result, the output rotation of the torque converter 4 is transmitted to the small sun gear 6a of the transmission gear mechanism through the turbine shaft 5, forward clutch 6i and one way clutch 51. In this case, the carrier 6e is fixed by means of the second one way clutch 6p so that the shift speed mechanism 6 operates as a fixed gear train which transmits the rotation from the small sun gear 6a to the ring gear through the short pinion gear 6c and long pinion gear 6d without making a differential action. As a result, the first stage of a large reduction ratio corresponding to a diameter ratio between the small sun gear 6a and the ring gear 6f is obtained.

In a second stage, the 2–4 brake 6m is further engaged in addition to the condition of the first stage. The large sun gear 6b is fixed and the second one way clutch 6p is brought to a racing condition. As a result, the rotation of the turbine shaft 5 is transmitted to the small sun gear 6a and then to the long pinion gear 6d through the short pinion gear 6c. In this case, since the large sun gear 6b is fixed, the long pinion gear 6d moves around the large sun gear 6b and thus the carrier 6e is rotated. As a result, the rotation speed of the ring gear 6f is increased by the rotation of the carrier 6e (revolution speed of the long pinion gear 6d) compared with the first stage. Thus, the second stage of a smaller reduction ratio than the first stage is obtained. In this case, the 2–4 brake 6m is operated to apply the braking force against normal rotation or rotation for a forward movement.

In a third stage, the 2–4 brake is released in the second stage and the 3–4 clutch 6k is engaged. As a result, the rotation of the turbine shaft 5 is transmitted to the small sun gear 6a through the forward clutch 6i and first one way clutch 6o as well as to the carrier 6e through the 3–4 clutch 6k. Thus, the shift speed 6 is integrally rotated so that the third stage is obtained in which the ring gear 6f is rotated at the same speed as the turbine shaft 5.

In a fourth stage, the 2–4 brake which is once released in the third stage is engaged again. Therefore, the rotation of the turbine shaft 5 is transmitted to the carrier 6e of the shift speed 6 through the 3–4 clutch 6k so that the long pinion gear 6d moves around the sun gear 6b. In this case, since the large sun gear 6b meshed with the long pinion gear 6d is fixed by means of the 2–4 brake 6m, the long pinion gear 6d moves around the sun gear 6b together with the carrier 6e and revolves on it own axis. As a result, the rotation of the ring gear 6f meshed with the long pinion gear 6d is increased by the rotation of the carrier 6e (the rotation of the turbine shaft 5) and the rotation of the long pinion gear 6d on its own axis so that the fourth stage of an over drive can be obtained. In this case, the forward clutch is engaged. It should be noted that the one way clutch 6o in tandem with the forward clutch 6i is raced so that there is no fear that the rotation of the turbine shaft 5 is introduced to the small sun gear 6a.

In a rearward stage, the reverse clutch 6l and the low-reverse brake 6n are engaged. Thus, the rotation of the turbine shaft 5 is introduced to the large sun gear 6b and the carrier 6e of the shift speed mechanism 6 is fixed. Therefore, the rotation of the turbine shaft 5 is transmitted to the ring gear 6f through a fixed gear train including the large sun gear 6b and long pinion gear 6d. A reduction ratio corresponding to the diameter of large sun gear 6d and ring gear 6f can be obtained. In this case, the rotating direction of the ring gear 6f is opposite to that of the turbine shaft 5 or the large sun gear 6b.

The first one way clutch 6o transmitting the rotation in the first to third stage and the second one way clutch 6p bearing a reaction force in the first stage are raced in a coasting condition. Therefore, in the above shift stages, the engine brake is not enacted. However, in the third stage in D range, second and third stages of S range and first and second stages of L range, the coast clutch 6j in parallel with the first one way clutch 6o is engaged and in the first stage of L range, low-reverse brake 6n in parallel with the second one way clutch 6p is engaged to provide the engine brake.

Table 1 shows operations of the respective frictional elements 6i–6n such as clutches and brakes and one way clutches 6o and 6p.

detected by the turbine speed sensor 27, output speed of the transmission detected by output speed sensor 28 and a hydraulic fluid temperature of the automatic transmission 2 (hereinafter referred to as a hydraulic temperature) detected by a hydraulic temperature sensor 29 as a control information.

The control unit C is implied to be an overall controller including the target shift time setting device f, inertia hydraulic pressure setting device h, input torque hydraulic pressure setting device i, target hydraulic pressure setting device j and target torque setting device. The turbine speed corresponds to the input member speed in the claims.

Figure 4:
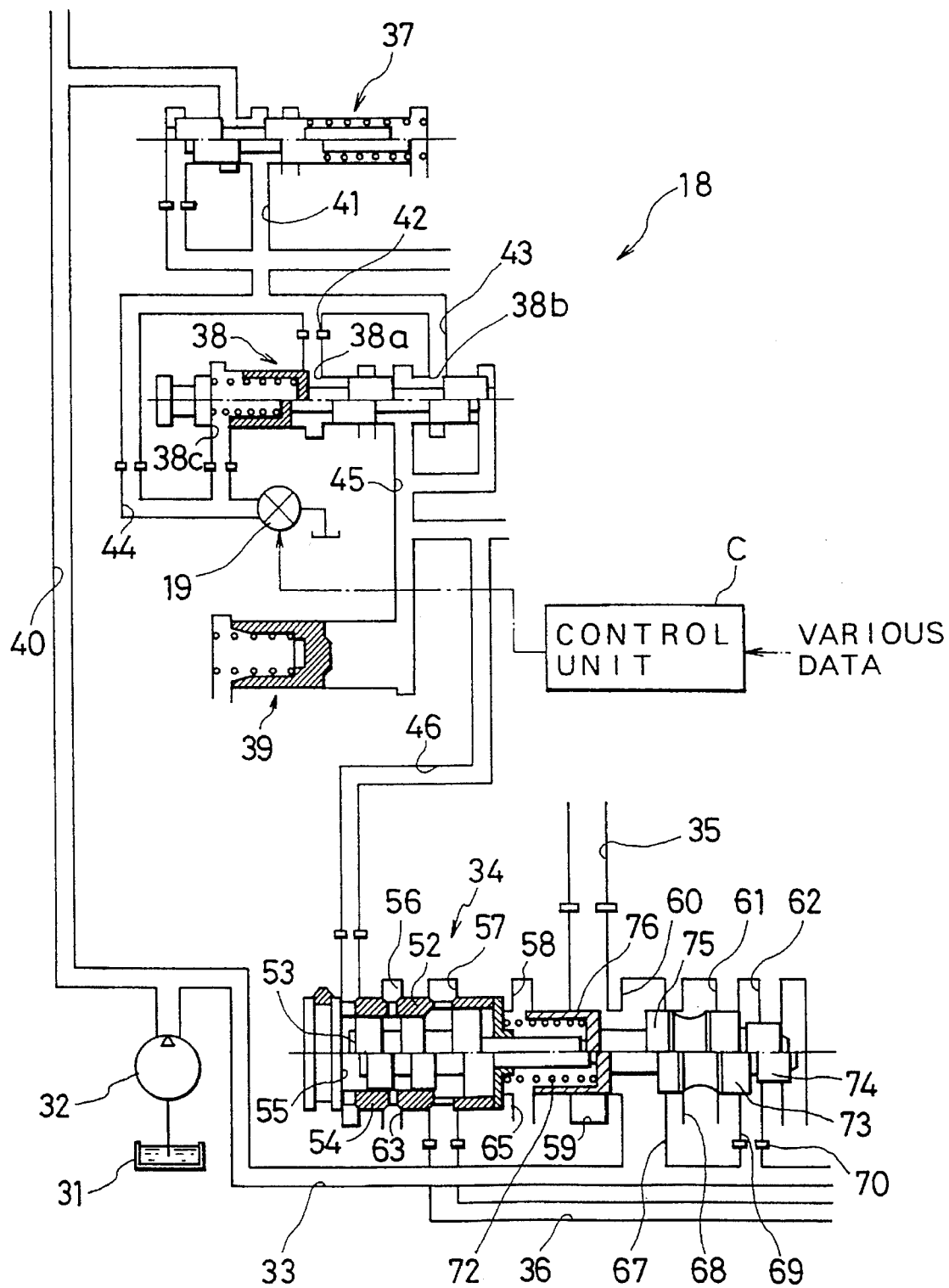
FIG. 4 shows a part of a hydraulic control circuit incorporated into the automatic transmission of the power train of FIG. 1.

As shown in FIG. 4, in the hydraulic mechanism 18, the hydraulic fluid in an oil pan 31 is discharged to a hydraulic fluid supply passage 33 by means of an oil pump 32 which is driven by a crank shaft or engine output shaft 3 (see FIG. 2) and introduced to various portions of the automatic transmission 2. Although a discharge pressure of the oil pump 32 changes in accordance with the engine speed, the line pressure or a hydraulic pressure in the hydraulic supply passage 23 is maintained at an optimized value in accordance with the operating condition by means of the control unit C as explained hereinbelow.

The hydraulic pressure mechanism 18 is provided with a pressure regulator valve 34 (line pressure control valve)

TABLE 1

| RANGE | FORWARD CLUTCH (6i) | COAST CLUTCH (6j) | 3–4 CLUTCH (6k) | REVERSE CLUTCH (6l) | 2–4 BRAKE (6m) | LOW REVERSE BRAKE (6n) | ONEWAY CLUTCH FIRST (6o) | ONEWAY CLUTCH SECOND (6p) |
|---|---|---|---|---|---|---|---|---|
| P | | | | | | | | |
| R | | | | ○ | | ○ | | |
| N | | | | | | | | |
| D | | | | | | | | |
| 1 | ○ | | | | | | ○ | ○ |
| 2 | ○ | | | | ○ | | ○ | |
| 3 | ○ | ○ | ○ | | | | ○ | |
| 4 | ○ | | ○ | | ○ | | | |
| S | | | | | | | | |
| 1 | ○ | | | | | | ○ | ○ |
| 2 | ○ | ○ | | | ○ | | ○ | |
| 3 | ○ | ○ | ○ | | | | ○ | |
| L | | | | | | | | |
| 1 | ○ | ○ | | | | ○ | ○ | ○ |
| 2 | ○ | ○ | | | ○ | | ○ | |

A hydraulic control mechanism 18 is provided for supplying the hydraulic fluid to the torque converter 4 and control the hydraulic fluid or pressure to and from the frictional elements (clutch and brake). The hydraulic control mechanism 18 is provided with a duty solenoid valve 19 for controlling the line pressure control and first to third on-off solenoid valves 20–22 for shift operation. The solenoid valves are controlled by a control unit C. The duty solenoid valve 19 controls the line pressure (basic pressure) of the hydraulic control mechanism 18. The on-off solenoid valves 20–22 are actuated to change shift positions of various shift valves (not shown) in accordance with the operating condition to switch the on-off pattern of the frictional elements (clutch, brake) to thereby switch the shift characteristics of the shift speed mechanism 6. To the control unit C are introduced an amount of the intake air detected by the air flow sensor 10, throttle opening of the main throttle valve 12 detected by the throttle sensor 24, engine cooling water temperature detected by a water temperature sensor 25, an engine speed (crank shaft speed) detected by the engine speed sensor 26, a turbine speed (turbine shaft speed)

which generates the line pressure in substantially proportion to a pilot pressure thereof in the supply passage 33 and supply the hydraulic pressure to the torque converter 4 through a first hydraulic passage 35 and to the shift speed mechanism 6 through a second hydraulic passage 6.

The pilot pressure of the pressure regulator valve 34 is formed by a reducing valve 37, throttle modulator valve 38, accumulator 39 and duty solenoid valve 19 which is controlled by the control unit C as follows.

The line pressure of the supply passage 33 is introduced into the reducing valve 37 through an oil introducing passage 40. After being reduced in the reducing valve 37, the line pressure is introduced to a reduced hydraulic passage 41. The hydraulic pressure of the hydraulic passage 41 is introduced to a first input port 38a of the throttle modulator valve 38 through a first branch hydraulic passage 42 and to a second input port 38b of a throttle modulator valve 38 through a second branch hydraulic passage 43. Further, the hydraulic pressure in the reduced hydraulic passage 41 is introduced into a control port 38c of the throttle modulator valve 38 through a third branch hydraulic passage 44 as well. In this case, the hydraulic pressure in the third branch hydraulic passage 44 or the hydraulic pressure acting on the control port 38c is controlled by the duty solenoid valve in accordance with a duty ratio produced by the control unit C. The duty ratio is determined by the control unit C in accordance with the operating condition.

A hydraulic pressure corresponding to the hydraulic pressure applied to the control port 38c is introduced from the throttle modulator valve 38 to a first pilot pressure passage 45 as a pilot pressure. Meanwhile, an accumulator 39 communicating with the first pilot pressure passage 45 is provided to suppress a pulsation or oscillation of the pilot pressure in the first pilot pressure passage 45.

Thus, the pilot pressure is introduced to the pressure regulator valve 34 through the second pilot pressure passage 46. A line pressure in proportion to the pilot pressure is formed in the supply passage 33 by the pressure regulator valve 34.

The pressure regulator valve 34 is provided with a valve body formed with a spool bore 52, a spool 53 slidably disposed in the bore 52 in its axial direction (right and left direction in FIG. 4) and a sleeve 54 disposed between the bore 52 and the spool 53. The bore 52 is formed with a plurality of expanded and reduced portions and the spool 53 is formed with a plurality of large diameter and small diameter portions so that first to eighth hydraulic chambers 55–62 are formed between the inner surface of the spool bore 52 and the outer surface of the spool 53 from the left side in order in FIG. 4.

The first hydraulic chamber 55 is communicated with the second pilot pressure passage 46 so that a pilot pressure is introduced into the first chamber 55 to bias the spool 53 rightward.

The second chamber 56 is communicated with a first drain hydraulic passage 63 which is opened to the space of the oil pan 31. The third chamber 57 is communicated with the second hydraulic passage 36 which is connected with a manual valve (not shown) at the other end. The fourth chamber 58 is connected with a second drain hydraulic passage 65 which is opened to a space of the oil pan 31 at one end. The fifth chamber 59 is connected with the first hydraulic passage 35 which is connected with the torque converter 4 at the other end. The sixth chamber 60 is connected with a first line hydraulic passage 67 which is connected with the supply passage 33 at the other end. The seventh chamber 61 is connected with a main drain hydraulic passage 68 which is opened to a space of the oil pan 31 at an end. The eighth chamber 62 is a second line hydraulic passage 69 which is connected with the supply passage 33 at an end. In this case, on the second line passage 69 is disposed an orifice 70 for eliminating a pulsation of the hydraulic pressure in the eighth chamber 62.

The left pressure surface 73 is relatively large and the right pressure surface 74 is relatively small when they contact with the hydraulic fluid so that the spool 53 is subjected to a leftward force due to the difference in size of the pressure surface in proportion to the hydraulic pressure in the eighth chamber 62 or the line pressure. The leftward force is one of feedback control factors of the line pressure control. The spool 53 is regularly urged in the right direction.

With the above structure, the spool 53 is subjected to the pilot pressure in the first hydraulic chamber 55 in the right direction and the line pressure in the eighth hydraulic chamber 62 in the left direction to be positioned at a balanced point of the forces due to the pilot pressure and the line pressure. When a hydraulic pressure is introduced to the third chamber 57 in the case where a reverse range is selected, the spool 53 is subjected a right ward force due to the hydraulic pressure.

Where the pilot pressure is low, the spool is moved leftward so that the large diameter portion 75 (land) is positioned at a left portion to expand the communication path between the first line hydraulic passage 67 and the main drain hydraulic passage 68. Thus, the hydraulic pressure in the first line hydraulic passage 67 or the hydraulic pressure in the supply passage 33 is released in the main drain hydraulic passage 68 to reduce the line pressure or the hydraulic pressure in the supply passage 33. Conversely, when the pilot pressure is increased, the spool 53 is moved in the right direction to move the land 75 rightward so that the communication passage between the first line hydraulic passage 67 and the main drain hydraulic passage 68 is reduced so that the amount of the hydraulic fluid released from the passage 33 is reduced to increase the line pressure.

Thus, a line pressure is formed in the supply passage 33 in substantial proportion to the pilot pressure. The line pressure introduced in the eighth chamber 62 is controlled corresponding to the pilot pressure by means of a feedback control. When the engine is in the operation, the spool 53 is positioned at a left position, the first line hydraulic passage 67 is brought into communication with the first hydraulic passage 35 so that the hydraulic pressure in the supply passage 33 is introduced to the torque converter 4 through the first hydraulic passage 35. On the other hand, when the engine is out of operation, the land 75 is positioned at a right position so that the first line hydraulic passage 7 is interrupted from the first hydraulic passage 35 by the land 75.

As aforementioned, the pilot pressure is formed corresponding to the duty ratio applied from the control unit C to the duty solenoid valve 19 and the line pressure is produced substantially in proportion with the pilot pressure. Eventually, the line pressure is formed in proportion to the duty ratio determined by the control unit C. Thus, the line pressure can be controlled by the control unit C.

The control unit C constituted by a micro computer receives an intake air amount, main throttle opening, engine cooling water temperature, engine speed (crank shaft speed), turbine speed (turbine shaft speed), output speed (output shaft speed), hydraulic fluid temperature and the like and carries out an overall control of the power train.

A general control of the power train have been already well known to the public so that an explanation therefor will be omitted and the line pressure control and torque down control in the power train which deeply relates to the present invention will be explained hereinbelow.

The line pressure control and torque down control should be limited to shift operations in which the engine speed are directly influenced when the frictional elements are engaged (on) or disengaged (off).

Figure 5:
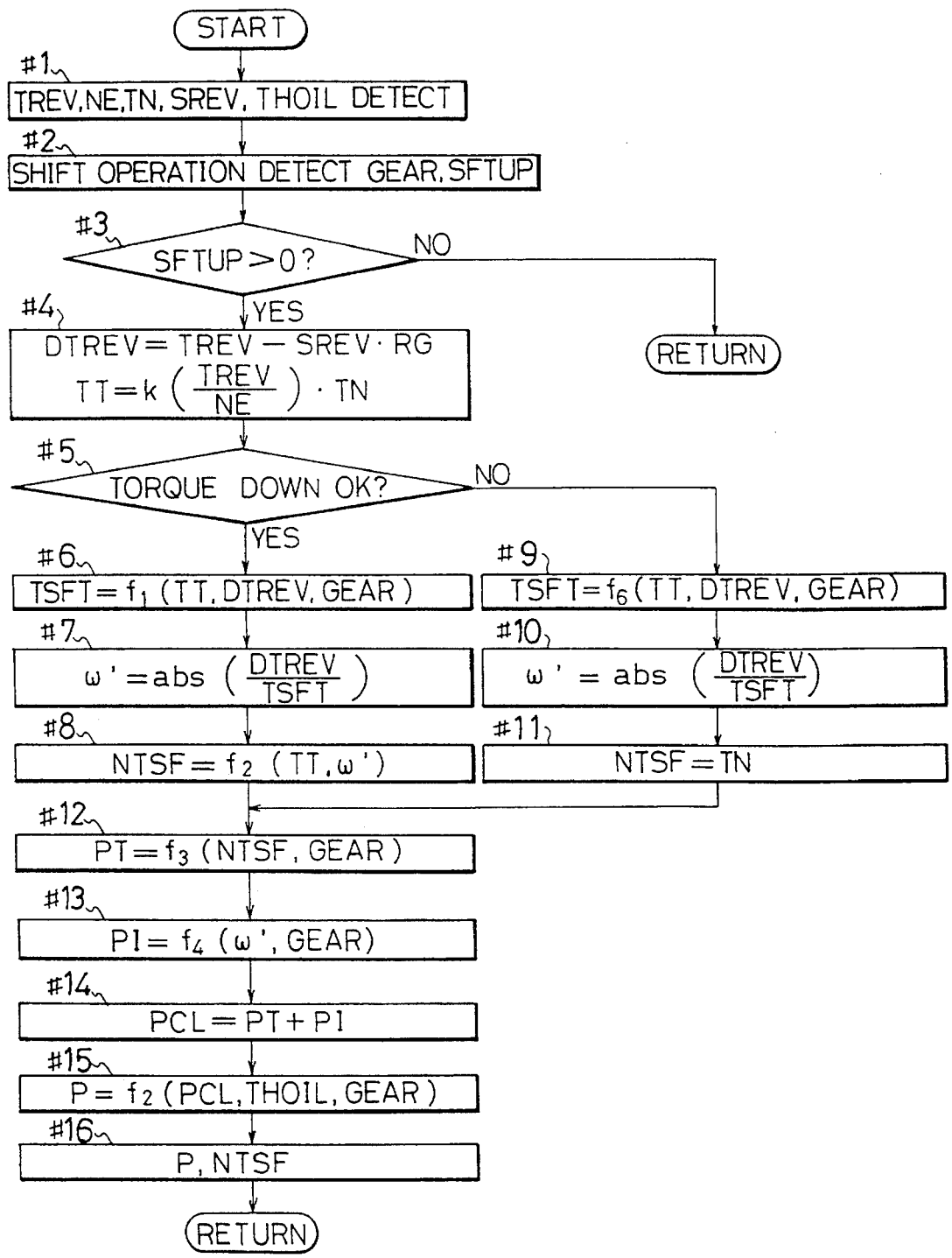
FIG. 5 is a flow chart showing a line pressure control.

A specific line pressure control in a shift-up operation is shown in FIG. 5 in the form of a flowchart. A specific torque down control is shown in a flow chart of FIG. 6.

The line pressure control by the control unit C will be explained hereinbelow.

Figure 7:
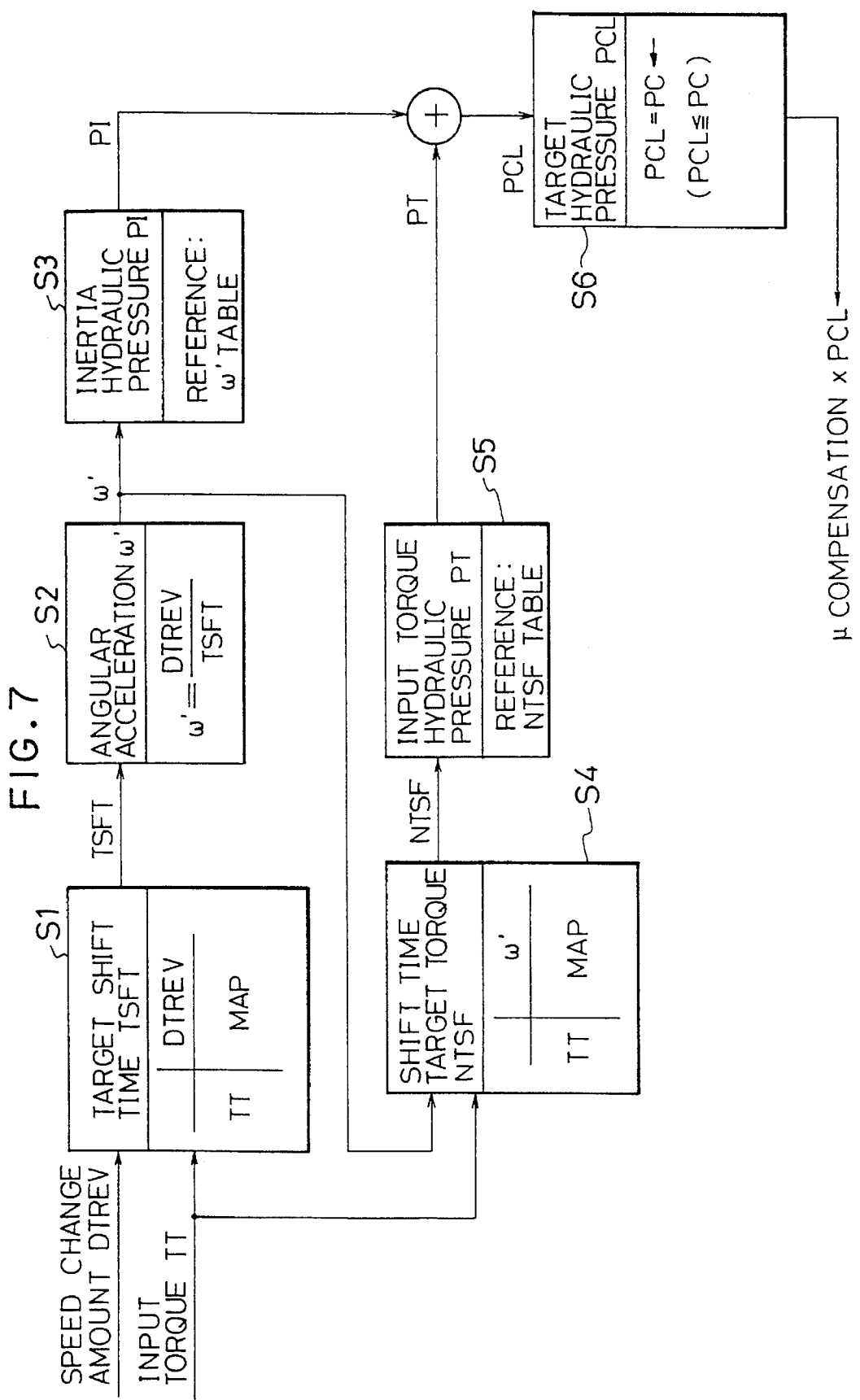
FIG. 7 is a block chart showing a relationship of procedures in the line pressure control where the torque down control is carried out.

In the illustrated embodiment, the basic logic of the line control in a shift operation. The flow chart of FIG. 7 shows the control in which the torque down control is made. On the other hand, in the flow chart of FIG. 8, the torque down control is not made.

As aforementioned, the engaging surface of the frictional element is subjected to an engaging force in the nominal direction and to the rotating force or transmitting torque in the circumferential direction during the shift operation. Therefore, the engaging force should be appropriately provided in accordance with a desired transmitting torque. In this case, the engaging force is substantially proportional to the line pressure of the hydraulic mechanism 18. On the other hand, the transmitting torque TOUT can be expressed by the following formulas;

$$TOUT = a*TT - b*w' + c*TCL \quad (1)$$

$$w' = d*TT - e*TCL \quad (2)$$

Wherein TOUT: transmitting torque of the frictional element,
TT: input torque to the shift speed mechanism,
w: angular acceleration of the turbine shaft,
TCL: reacting force of the frictional element,
a, b, c, d, e: constants.

In the line pressure control, the line pressure of the hydraulic control mechanism 18 is controlled based on the formulas (1) and (2) to provide a desirable transmitting torque during the shift operation so that the shift time is effectively reduced without producing a torque shock in the shift operation. As apparent from formulas (1) and (2), by setting the values TOUT and w, the values TT and TCL can be obtained.

As shown in FIG. 7, the basic logic of the line pressure control in which the torque down is made during the shift operation is as follows.

In order to make a shift operation, a target shift time TSFT is set based on an amount of the change of the input member speed DTRE of the shift speed mechanism 6 through the shift operation, in other words, the speed difference of the turbine speed TREV before the shift operation and the turbine speed TREV after the shift operation, and the input torque TT introduced to the shift speed mechanism 6 or the torque of the turbine shaft 5 (block S1).

The input torque TT is calculated by means of a well known method based on an engine load (main throttle opening), engine speed, ignition timing and the like wherein it is assumed that the torque down is not produced.

Generally, The shorter shift time is accomplished, the more responsiveness can be obtained and the better running performance can be obtained during the shift operation. However, in the shift-up operation, the output torque in the output shaft 7 is temporarily increased due to the moment force which is produced in connection with the moment of inertia of the power transmitting system to the shift speed mechanism during the shift operation. This torque increase is soared as the shift time is decreased. As the torque increase is soared, the torque shock in the shift operation is enhanced so that the shift time cannot be unduly decreased. In view of this, the minimum shift time is determined in accordance with the operating condition in order to suppress the torque shock during the shift operation. The minimum shift time is defined as the target shift time TSFT. The target shift time TSFT is stored in the control unit C in the form of a map with regard to the speed change DTREV and input torque TT as parameters.

The angular acceleration w of the turbine speed TREV of the shift speed mechanism 6 is calculated based on the target shift time TSFT and the speed change amount DTREV by utilizing the formula (3) (block S2).

$$w' = DTREV/TSFT \quad (3)$$

As well known to the public, assuming that the moment of inertia I of the power transmitting system to the shift speed mechanism 6 from the engine, the moment force N of the power transmitting system, in other words, the moment force acting on the frictional element which is to be engaged in the shift operation can be expressed by a product of I and w' (I*w'). Since the moment of inertia I of the power train is constant, the moment force N must be proportional to the angular acceleration w'. Therefore, the moment force N acting on the frictional element can be obtained merely based on the angular acceleration w'.

Next, an inertia hydraulic PI is set to cope with the moment force N based on the angular acceleration w' obtained in the block S2 (block S3).

As mentioned above, the moment force N acts on the frictional element during the shift operation so that it is necessary to control the line pressure or the engaging force of the frictional element in accordance with the moment force N. In this case, the moment force N is proportional to the angular acceleration w' so that the inertia pressure PI can be determined based on the angular acceleration w in order to cope with the moment force N. The inertia hydraulic pressure is stored in the control unit C in the form of a map with regard to the angular acceleration w as a parameter.

The control unit C sets the target torque during the shift operation NTSG taking account of the torque down based on the angular acceleration w' in addition to the setting of the inertia hydraulic pressure PI (block S4).

Generally, in the shift up operation, the moment force N due to the power transmitting system to the shift speed mechanism acts on the frictional element in the same direction of the input torque so that the torque of the output shaft 7 is temporarily soared to produce the shift shock. In order to suppress the shift shock, the output torque is controlled to be restricted during the shift operation (torque down control). As aforementioned, although it is preferable to suppress the shift shock while reducing the shift time, the shorter shift time tends to produce the greater shift time. In view of this, the engine 1 is controlled to reduce the output torque or to carry out the torque down so as to suppress the shift shock while reducing the shift time. The engine torque is determined in accordance with the operating condition with the shift time being determined so as not to deteriorate the running performance of the vehicle and effectively suppress the shift shock. The engine torque is defined as a target torque NTSF during the shift operation. The target torque NTSF during the shift operation is stored in the control unit C in the form of a map with regard to the target torque NTSF and the angular acceleration w'.

Figure 16:
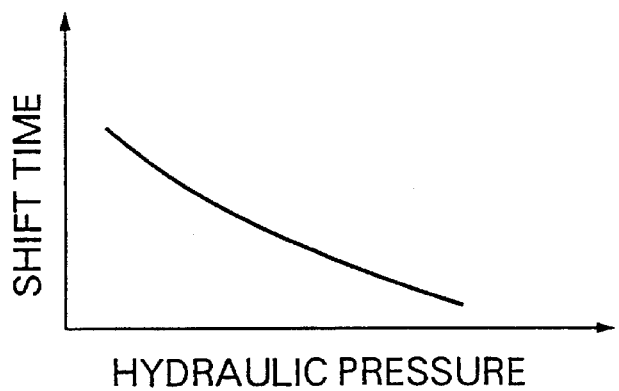
FIG. 16 is a graphical representation of a characteristic of a shift time to the hydraulic pressure.
Figure 17:
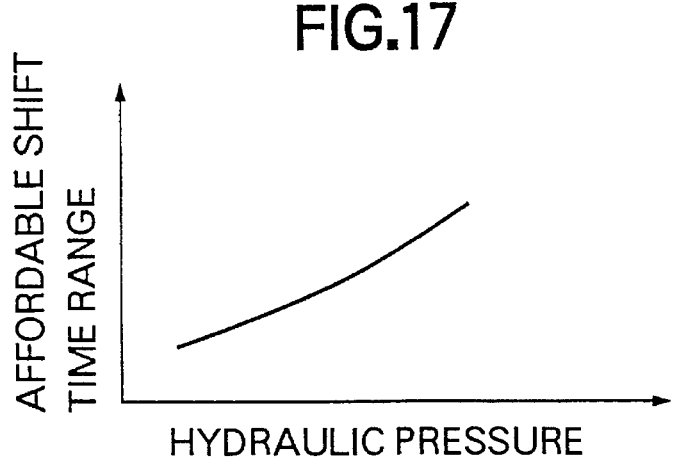
FIG. 17 is a graphical representation of a characteristic of an affordable shift time range to the hydraulic pressure.
Figure 18:
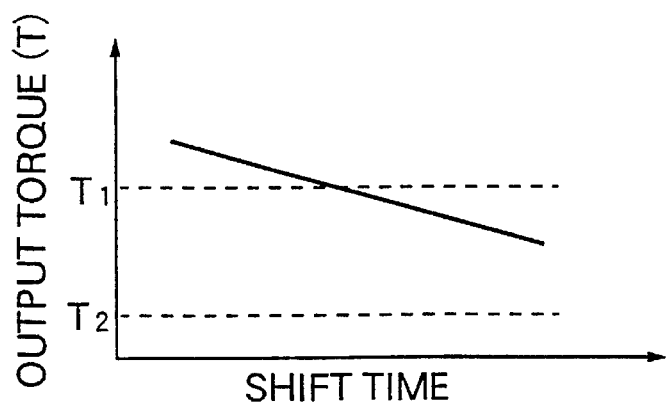
FIG. 18 is a graphical representation of a characteristic of an output torque (output shaft torque) to the shift time.

In detail, a characteristic of the shift time in the shift up operation to the hydraulic pressure, for example, is shown in FIG. 16. During the shift operation, the engaging hydraulic pressure is increased to have a plateau range. An affordable shift time range within which the shift operation can take place during the plateau range of the hydraulic pressure as shown in FIG. 17. The characteristic of output shaft torque T to the shift time is shown in FIG. 18. In FIG. 18, the value $T_1$ is an output torque before the shift up operation and the value $T_2$ is an output shaft torque after the shift up operation.

Figure 19:
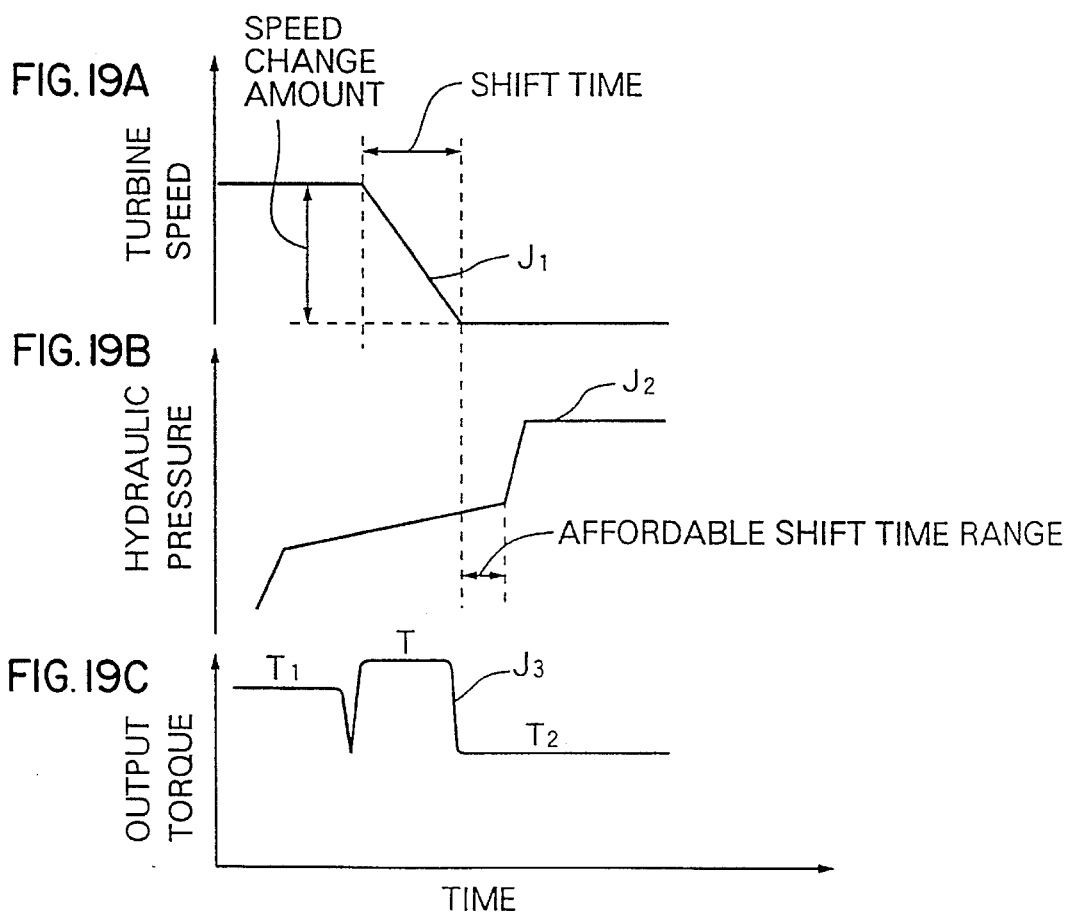
FIG. 19 is a time chart showing changes of the turbine speed, the line hydraulic pressure controlled and output torque.

The turbine speed, hydraulic pressure and output shaft torque is changed as shown by lines $J_1$, $J_2$ and $J_3$ in a time chart of FIG. 19. As seen from FIG. 18, the output torque T is greater than the values $T_1$ and $T_2$ during the shift operation. A high output shaft torque T during the shift operation may cause the shift shock. As the shift time is reduced, the output shaft torque is increased as apparent from FIG. 18.

As aforementioned, the shift time cannot extend unduly in order to maintain a good responsiveness and running performance during the shift operation. In view of this, the raise of the output shaft torque T is suppressed as low as possible in the shift up operation in addition, the line pressure is determined in accordance with the transmitting torque so that the shift time can be effectively reduced while suppressing the shift shock. In other words, the control unit C determines the shift speed characteristics taking account of the parameters shown in FIGS. 16–18 to suppress the shift shock without extending the shift time.

The control unit C determines the input torque hydraulic pressure PT based on the target torque which is the engine torque taking account of the torque down (block S5). The input torque hydraulic pressure PT is a line pressure for obtaining an engaging pressure of the frictional element which provides the input torque TT introduced to the frictional element of the shift speed mechanism 6. The input torque hydraulic pressure PT is stored in the control unit C in the form of a table with regard to the target torque NTSF during the shift operation.

Figure 13:
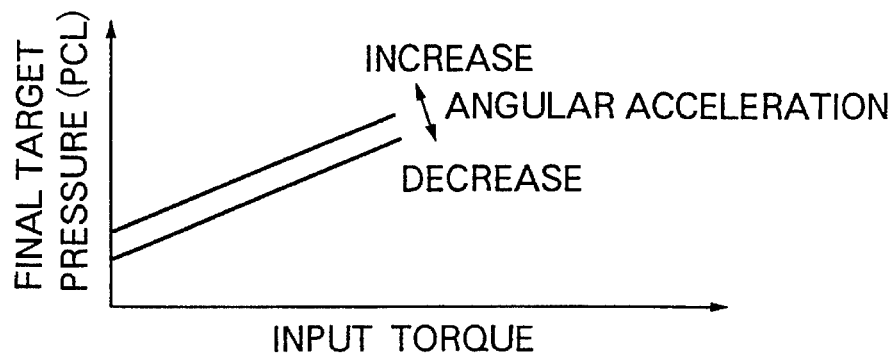
FIG. 13 is a graphical representation of a characteristic of a target hydraulic pressure to an input torque and an angular acceleration.
Figure 14:
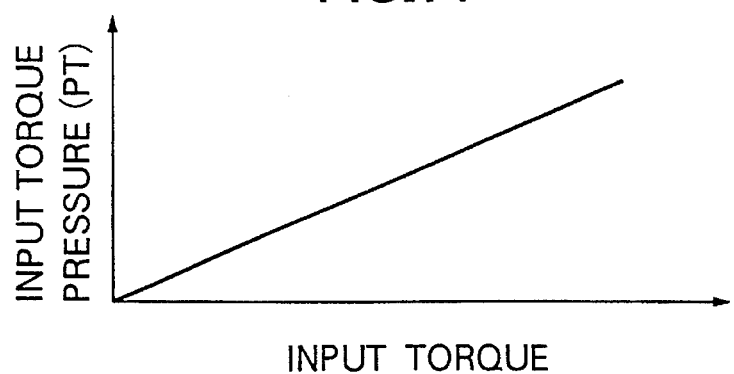
FIG. 14 is a graphical representation of a characteristic of an input torque hydraulic pressure to the input torque.
Figure 15:
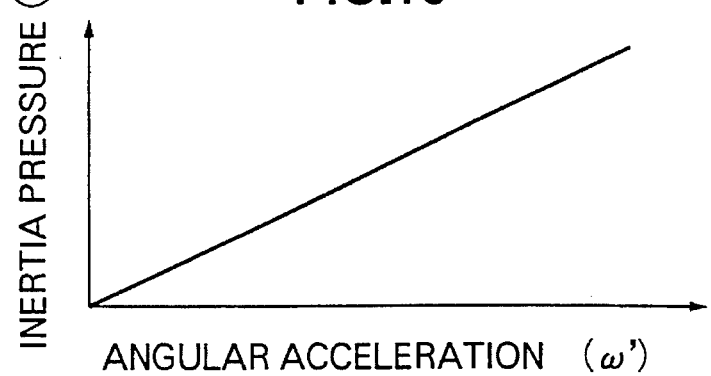
FIG. 15 is a graphical representation of a characteristic of an inertia hydraulic pressure to the angular acceleration.

Then, a final target hydraulic pressure PCL is set based on the inertia PI and input torque PT (block S6). In this case, if the value PCL is not greater than a clutch pressure guard value PC for keeping the minimal value of the clutch pressure, the value PC is used as the final target hydraulic pressure PCL. The pressure PCL is compensated in accordance with a frictional coefficient μ of the frictionally engaging surface of the frictional element to be a final target line pressure. The final target hydraulic pressure PCL is changed with regard to input torque TT and the angular acceleration w' as shown in FIG. 13. The input torque hydraulic pressure PT is changed with regard to the input torque as shown in FIG. 14. The inertia hydraulic pressure PI is changed with regard to the angular acceleration w' as shown in FIG. 15.

FIG. 8 shows a control logic of the line pressure control in which a torque down control is not carried out during the shift operation. The procedures S11–S16 in FIG. 8 is basically identical with those of S1–S6 in FIG. 7. However, the control shown in FIG. 8 does not carry out the torque down control so that the input torque TT is used for the target torque NTSF during the shift operation as it is (block S14). The input torque hydraulic pressure PT is set based on the target torque NTSF (block S15).

The final target hydraulic pressure PCL is set based on the inertia hydraulic pressure PI and input torque hydraulic pressure PT (block S16).

If the value PCL is not greater than a clutch pressure guard value PC for keeping the minimal value of the clutch pressure, the value PC is used as the final target hydraulic pressure PCL. The pressure PCL is compensated in accordance with a frictional coefficient μ of the frictionally engaging surface of the frictional element to be a final target line pressure.

Hereinafter, a specific line pressure control is explained in the shift up operation by the control unit C in accordance with a flow chart shown in FIG. 5.

As shown in FIG. 5, the control unit C detects the turbine speed TREV (input member speed of the shift speed mechanism 6), the engine speed NE, engine torque TN(torque of the crank shaft 3), the output shaft speed SREV and hydraulic temperature THOIL in step #1. The engine torque TN denotes the one which does not take account of the torque down.

Next, the control unit C judges whether or not the shift operation command is produced in step #2. Based in the judgment of the step #2, the current shift stage GEAR and the value of the shift up flag SFTUP is outputted. The shift up flag SFTUP is set at 1 when the shift operation is started and is rest at 0 when the shift operation is finished.

As shown in FIG. 9, when a shift up operation is made to switch from a lower shift stage such as a first stage to a higher stage such as a second stage so as to accomplish the target gear ratio (line G2 in FIG. 9) at a time t1, the turbine speed TREV changes as shown by the line G1. In this case, initial values of timers TJ and TK are set at the time t1. The shift flag SFTUP is set at 1. The timer TJ is reduced 1 by 1 as the time goes from the start of the shift operation (time t1). When the time period corresponding to the initial value has passed, the timer TJ returns to 0. The timer TK is started to be decrement by 1 as the time goes from the time t2 when the gear ratio is reduced below the predetermined value and returns to 0 when the time period corresponding to the initial value has passed. The shift up flag SFTUP is rest at 0 when either the timers TJ or TK returns to 0.

FIG. 11 shows a similar graphical representation to the FIG. 9 in the shift down operation. In this case, a shift down flag SFTDW is set at 1 during the shift operation. In FIG. 11, the target gear ratio H2 is switched from a higher stage to a lower stage at the time θ to start the shift down operation so that the turbine speed TREV changes as shown by the line H1 in FIG. 11. In this case, initial values of the timer TJ and TK are set at the time θ and the shift down flag SFTDW is set at 1.

The timer TJ is reduced 1 by 1 as the time goes from the start of the shift operation (time 81) to return to 0 when the time corresponding to the initial value has passed. The timer TK is reduced 1 by 1 from the time 82 when the gear ratio (shift ratio) is greater than a predetermined value, The timer TK is returned to 0 when the time period corresponding to the initial value has passed. The shift down flag SFTDW is rest at 0 when either the timer TJ or the timer TK is returned to 0.

In step #3, it is judged that the shift up flag SFTUP is greater than 0. If the flag SFTUP is not greater than 0, or if the judgment is no, the shift up operation is not made. The control unit c returns the procedure to the step #1.

On the other hand, if it is judged that the shift up flag SFTUP is greater than 0 in step #3, the line pressure is set in the steps #4–#16 for the shift up operation. Specifically, in the step #4, the rotation speed change DTREV is calculated according to a formula (4) and the input torque TT is calculated by a formula (5).

$$DTREV = TREV - SREV * RG \quad (4)$$

$$TT = k(TREV/NE) * TN \quad (5)$$

Wherein

DTREV: rotation speed change,

TREV: turbine speed,

SREV: output shaft speed,

RG: gear ratio after the completion of the shift up operation,

TT: input torque,

NE: engine speed,

TN: engine torque, k: torque ratio of torque converter.

In formula (5), k(TREV/NE) denotes a torque ratio corresponds to the speed ratio (TREV/NE) of the torque converter 4. Next, it is judged if the torque down can be made without deteriorating the operation of the engine 1 in step #5. In the illustrated embodiment, when the engine is in a lower temperature condition, or when the engine cooling water is relatively low, or when some failure is produced in the engine 1, the torque down is not made because the torque down operation would produce a problem such as engine stall.

When it is judged that the torque down is possible in step #5, the target shift time TSFT for enabling the torque down is calculated based on the input torque TT, speed change amount DTREV and shift stage GEAR in step #6.

In this case, the target time TSFT is stored in the control unit C in the form of a map with regard to the input torque TT and the speed change amount DTREV as parameters for each of the shift stages GEAR. Thus, the control unit C scans the map to set the target TSFT in accordance with the shift stage GEAR, input torque TT and the speed change amount DTREV. The maps for setting the target shift time are prepared separately for a case where the torque down is not carried out during the shift operation and for another case where the torque down is carried out during the shift operation.

Since the illustrated embodiment, the torque down is carried out during the shift operation, the map for the torque down is used in the illustrated embodiment.

Next, the angular acceleration w' is calculated using the following formula (6) instep #7.

$$w'=abs(DTREV/TSFT) \quad (6)$$

Wherein

DTREV: speed change amount,

TSFT: target shift time, abs: absolute value.

Thus, the abs(DTREV/TSFT) means the absolute value of the value DTREV/TSFT.

In step #8, the target torque NTSF for carrying out the torque down control during the shift operation is set based on the input torque TT and the angular acceleration w' in step #8. Thereafter, the step #12 is carried out.

The target torque NTSF is stored in the control unit C in the form of a map (hereinafter referred to as a target torque setting map) with regard to the input torque TT and the angular acceleration w' as parameters. The control unit C searches the torque setting map to set the target torque NTSF in accordance with the input torque TT and angular acceleration w'.

On the other hand, when it is judged that the torque down is not possible in step #5, the target shift speed time TSFT for not carrying out the torque down during the shift operation is calculated in light of the target torque setting map for not carrying out the torque down based on the input torque TT and the speed change amount DTREV and the shift stage GEAR in step #9.

Next, the angular acceleration w' is calculated by the formula (6) in step #10. Then, the engine torque TN is provided as the target torque NTSF in step #11. Then, the step #12 is carried out. Thus, the engine torque is adopted as the target torque NTSF as it is.

Thereafter, the steps #12–#16 are carried out in this order.

In the step #12, the input torque hydraulic pressure PT is calculated based on the target torque NTSG and shift stage GEAR. The input torque hydraulic pressure PT is determined in a manner that the engaging force of the frictional element to be engaged in the shift up operation can afford to the transmission of the input torque TT. In other words, the hydraulic pressure PT is a minimum pressure which prevents from an excessive slippage of the frictional element assuming that only the input torque TT is introduced to the shift speed mechanism 6.

In step #13, the inertial hydraulic pressure PI is calculated based on the angular acceleration w' and the shift stage GEAR. The inertia hydraulic pressure is provided for compensating the engaging force of the frictional element to be engaged in the shift up operation so as to cope with the moment force due to the moment of inertia of the power transmitting system introduced to the shift speed mechanism. In detail, the moment force acts on the frictional element in the same direction as the input torque TT to increase the transmitting torque through the frictional element. In view of this, the line pressure is increased by the inertial hydraulic pressure to prevent the frictional element from an excessive slippage.

In step. #14, the target hydraulic pressure PCL is calculated based on the input torque hydraulic pressure PT an inertia hydraulic pressure PI using the following formula (7).

$$PCL=PT+PI \quad (7)$$

In step #15, the target hydraulic pressure PCL is subjected to a hydraulic temperature compensation to be the final line pressure P. The target line pressure P is stored in the control unit C in the form of a map (hereinafter referred to as a target line pressure setting map) with regard to the target hydraulic pressure PCL and the hydraulic temperature THOIL as parameters. The control unit C searches the torque setting map to set the target line pressure P in accordance with the target hydraulic pressure PCL and the hydraulic temperature THOIL.

The reason why the target hydraulic pressure PCL is compensated based on the hydraulic temperature THOIL is as follows.

Generally, a frictional element is engaged when a pair of engaging members facing each other are brought into a frictional engagement. It should, however be noted that the engaging surfaces of the frictional coefficients $\mu$ of the engaging surfaces depends on the hydraulic temperature of the engaging members of the frictional element.

Figure 20:
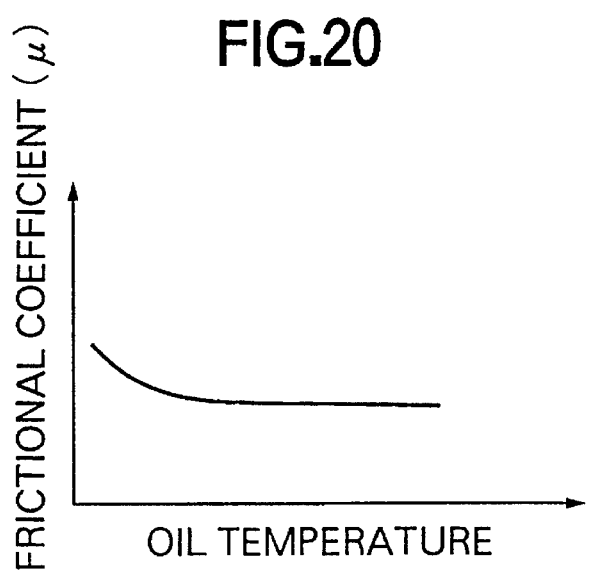
FIG. 20 is a graphical representation of a characteristic of a frictional coefficient of the frictional element involved in the shift operation to an oil (hydraulic) temperature.

Specifically, as shown in FIG. 20, as the hydraulic temperature is lowered, the frictional coefficient of the clutch $\mu$ is increased. Thus, when the hydraulic temperature THOIL is low, the frictional coefficient of the frictional members is high so that the engaging force of the frictional element is increased even where the line pressure is the same. Therefore, if the change of the frictional coefficient of the frictional element is not taken into account, the shift shock would be produced when the hydraulic temperature is low because the shift time is reduced compared with the high temperature condition of the hydraulic fluid. On the contrary, when the hydraulic temperature is high, the shift time is long and thus the responsiveness or running performance is deteriorated.

Figure 21:
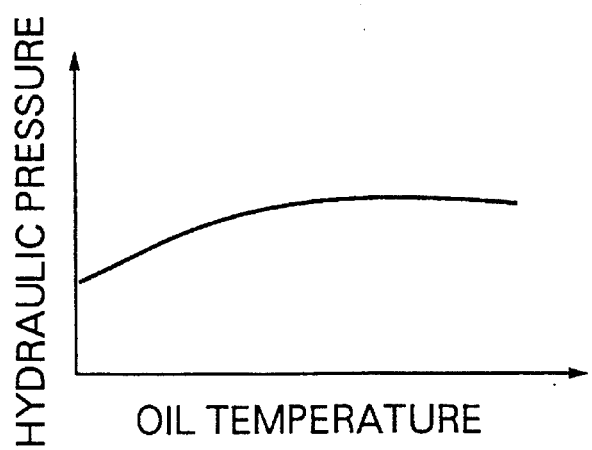
FIG. 21 is a graphical representation of a characteristic of the line hydraulic pressure to the oil temperature.

In view of this, as shown in FIG. 21, as the hydraulic temperature THOIL is lowered, the target line pressure P is set at a lower value to deal with the change of the frictional element.

In step #16, the control unit C outputs the target line pressure P and target torque NTSF and applies the duty ratio corresponding to the line pressure P to the duty solenoid valve 19 to carry out a feedback control so that the line pressure in the hydraulic control mechanism 18 reaches the target line pressure P.

Hereinafter, a specific torque down control by the control unit C in the shift up operation will be explained in accordance with the flow chart shown in FIG. 6. The control unit C detects the engine torque TN (torque of the crank shaft 3), gear ratio RG (shift speed ratio), turbine speed TREV (input member speed of the shift speed mechanism), target torque NTSF. Meanwhile, the engine torque is calculated based on the engine load, engine speed, ignition timing and the like assuming that no torque down control is carried out during the shift operation.

Next, it is judged whether or not the shift operation command is produced in step #22. In addition, other information is introduced to detect the operating condition, and the shift conditions.

In step #23, it is judged whether or not the shift up operation is underway. This judgment is made by referring the shift up flag SFTUP which is set or reset in the control shown in FIG. 5. If the judgment is no or if the transmission is not in the shift up operation, the engine torque TN is set at a final target torque MTE (hereinafter referred to as target engine torque MTE) and the torque down control is not carried out.

As aforementioned, the torque down control is carried out in order to suppress the temporary raise of the output shaft torque due to the moment force during the shift up operation. Thus, there is no need to carry out the torque down as far as there is no shift operation.

The control unit C produces the target engine torque MTE so as to control the engine torque based on the target engine torque MTE. Then, procedure is returned to the step #21.

Where it is judged that it is in the shift up operation in step #23, the torque down flag TOWN is set at 1 or reset at 0 as the shift up operation is proceeded in steps #24–#28. In steps #29–#35, the target engine torque MTE is set taking account of the torque down control in view of the torque down flag TDWN. The torque down flag normally takes 0 (reset condition) and set at 1 when the torque down is to be started. Then, the torque down is rest at 0 when the torque down is to be finished.

In the steps #24–#28, the torque down flag TDWN is set or reset in accordance with the following procedures.

After the shift up operation is started, when it is judged that the gear ratio RG is smaller than the first predetermined value g1(TREV) in the step #25, the torque down flag TDWN is set at 1 in step #26. In this case, the value g1(TREV) is set at a value smaller than the gear ratio just before the shift operation is started.

Thus, when the turbine speed TREV is reduced slightly below the turbine speed before the shift up operation, in other words, when the turbine speed begins to be reduced due to the shift up operation, the torque down flag TDWN is set at 1.

Then, when it is judged that the gear ratio is smaller than a second predetermined value g2(TREV), the torque down flag TDWN is rest at 0 instep #28. In this case, the value of the g2(TREV) have a value greater than the gear ratio after the completion of the shift up operation. Therefore, the turbine speed closes to the value after the completion of the shift up operation, in other words, when the shift up operation is about to be completed, the torque down flag TDWN is rest at 0. During the torque down flag taking the value 1, the target engine torque down MTE is set at a low value to carry out the torque down.

In the series of the steps #29–#35, the target torque MTE is set based on the value of the torque down flag TDWN(i) of the current cycle and the value of the previous cycle TDWN(1–i) considering that the torque down control is carried out.

Specifically, when it is judged that the value TDWN(i) is 1 and the value TDWN(i–1) is 0 in the step #29–#31, the target torque is set based on the following formula (8) in step #33.

$$MTE=TN-(TN-NTSF)*K1 \tag{8}$$

Wherein

TN: engine torque,

NTSF: target torque calculated through the line pressure control routine,

Ki: constant (<1).

Where it is judged that both the values TDWN(i) and TDWN (i–1) are 1, the target torque MTE is set in step #32 by the following formula (9):

$$MTE=max[NTSF, (MTE(i-1)-K3)] \tag{9}$$

In the formula (9), it should be understood that max [a, b] indicates a greater one of a and b. MTE(i–1) means the value of the target engine torque MTE in the precedent cycle. K3 is a constant showing a reducing rate of the target torque MTE.

Where it is judged that the flag value TDWN(i) in the current cycle is 0 and the flag value TDWN(i–1) in the precedent value is 1, the target engine torque MTE is calculated by the following formula (10).

$$MTE=(TN-NTSF)*K2+NTSF \tag{10}$$

In the formula (10), K2 is a constant (<1).

Where it is judged that both the flag value TDWN(i) in the current cycle and the flag value TDWN (i–1) in the precedent cycle are 0, the target engine torque MTE is set by the following formula (11).

$$MTE=min[TN, (MTE(i-1)+K4] \tag{11}$$

In the formula (11), it is intended that the value min[a, b] means a smaller one of a and b.

K4 is a constant indicating an increasing rate of the target torque MTE.

FIG. 10 shows the change of the turbine speed TREV (line G6), changes of various flags (lines G7, G8, G10 and G11), change of timer (line G9) and the change of the target engine torque MTE (line G12) as the time goes on.

In order to matches FIG. 10 with FIG. 9, the shift up operation is started so that the shift up flag SFTUP is set at 1 at a time t1. Then, the shift up flag SFTUP is reset at 0 at a time t3.

Figure 6:
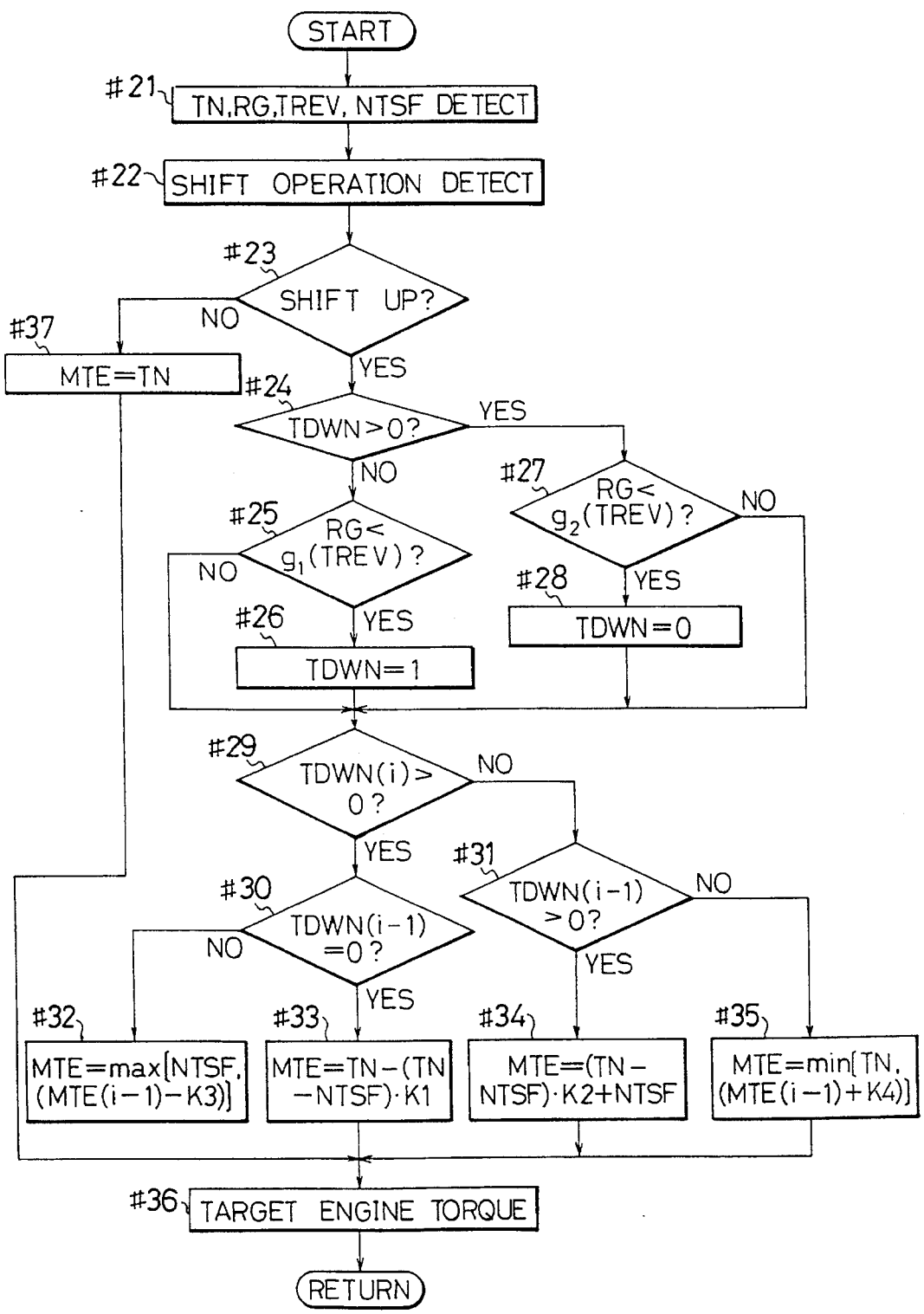
FIG. 6 is a flow chart showing a torque down control.

As shown in FIG. 10, the control unit C is provided with flags SFTSTU and SFTSTUA as sub-flags for setting or resetting the torque down flag TDWN and a timer CTC which are not shown in the flow chart of FIG. 6.

The shift up flag SFTUP is set or reset in the line pressure control routine and is referred to in the torque down control routine. The shift up flag SFTUP is set at the time 1 and reset at the time t3 as well as the procedure in FIG. 9.

The flag SFTSTU is set when the shift up flag SFTUP is set (time t1) and reset when the gear ratio RG is reduced below a predetermined value at a time t5. The predetermined value is slightly smaller than the gear ratio RG before the shift up operation. Therefore, the flag SFTSTU is reset when the turbine speed TREV is slightly reduced below the value before the shift up operation.

The flag SFTSTUA is set when the gear ratio RG is reduced below the gear ratio g1 (time t4) and reset when the shift up flag SFTUP is reset (time t3).

The timer CTC is initially set when the shift up flag SFTUP is set (time t1), started to be reduced 1 by 1 when the torque down flag TDWN is set (time t4) and eventually returned to 0 after the predetermined time period has passed.

The torque down flag TDWN is generally set when the flag SFTSTUA is set (time t4) and reset when the gear ratio RG is reduced below the value g2(time 6). If the flag SFTSTU is reset earlier than the reset of the flag SFTSTUA, the torque down flag TDWN is set when the flag SFTSTU is reset.

Thus, the flags SFTSTU, SFTSTUA, SFTUP, TDWN and the timer CTC are associated with together so that the target engine torque MTE are changed in accordance with a characteristic as shown by a line G12.

The engine torque TN means the one before or after the shift up operation without taking account of the torque down control. The engine torque NTSF is the one during the shift up operation except a transitional period.

In the shift up operation, the target torque MTE is reduced abruptly at the time t4 as a result that the step #33 is carried out. As a result of the execution of the step #32, the target engine torque MTE is substantially constant after the time t4 and as a result of the execution of the step #34, the target torque MTE is stepwisely increased at a time t6. Further, as a result of the execution of a step #35, the target torque MTE is kept substantially constant after a time t6.

Thus, in order to prevent the engine torque from being reduced far below the final target engine torque NTSF (prevent an undershooting), the target engine torque MTE is gradually reduced for a certain time period (transitional period) after the time t4. On the other hand, in order to prevent the engine torque from being increased far beyond a desirable engine torque TN (prevent an overshooting), the target engine torque MTE is gradually increased for a certain time period (transitional period).

As obvious from the formula (8), the target engine torque MTE at the start of the torque down control is appropriately set in accordance with a basic torque down amount (TN-NTSF).

As obvious from the formula (10), the target torque MTE at the end of the torque down control is appropriately set in accordance with a basic torque down amount (TN-NTSF).

FIG. 12 shows the change of the turbine speed TREV (line H6), the change of various flag values (lines H7, H9), change of timer (line H8) and target engine torque MTE (line H10) as the time goes on respectively.

In order to match FIG. 12 with FIG. 11, the shift down operation is started to set the shift sown flag SFTDW at a time 81 and to reset at a time 83. As seen from FIG. 12, in the case of the shift down control, the torque down control lasts for only a short time period (time 84 to time 85).

The target engine torque MTE set at either one of the steps #32–#35 is outputted at the step #36. The control unit C controls the opening of the electro-throttle valve 11 and/or ignition timing of an ignition device 15 so as to carry out the torque down control to accomplish the target engine torque MTE. Thereafter, the procedure is returned to the step #21.

According to the above control, the line pressure and engine torque can be provided appropriately.

Referring to FIGS. 21–30, another embodiment of the present invention will be explained.

A detailed explanation for the same procedures as the former embodiment will be omitted.

Figure 22:
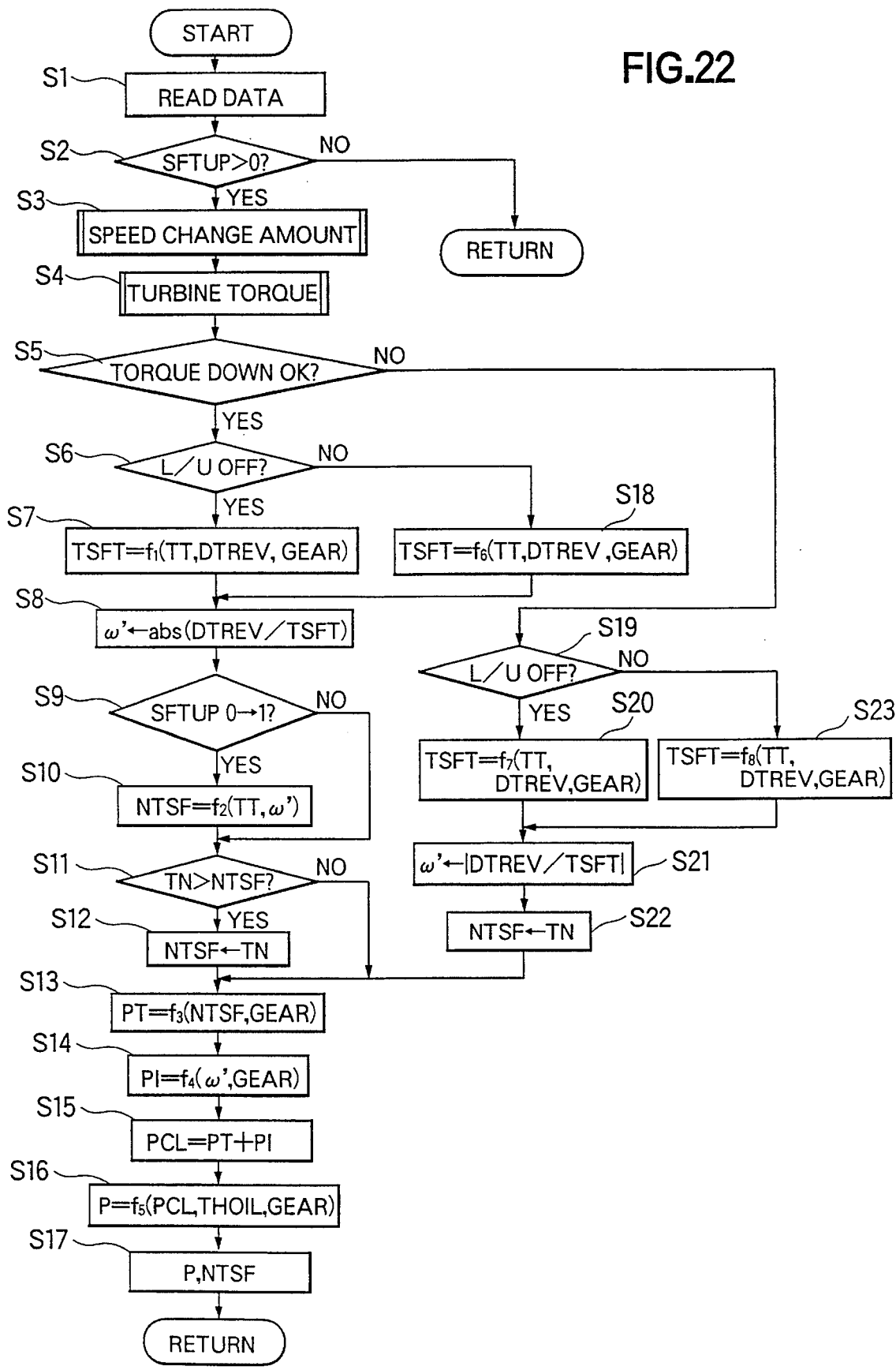
FIG. 22 is a flow chart of a line pressure control similar to FIG. 5 according to another embodiment of the present invention.
Figure 23:
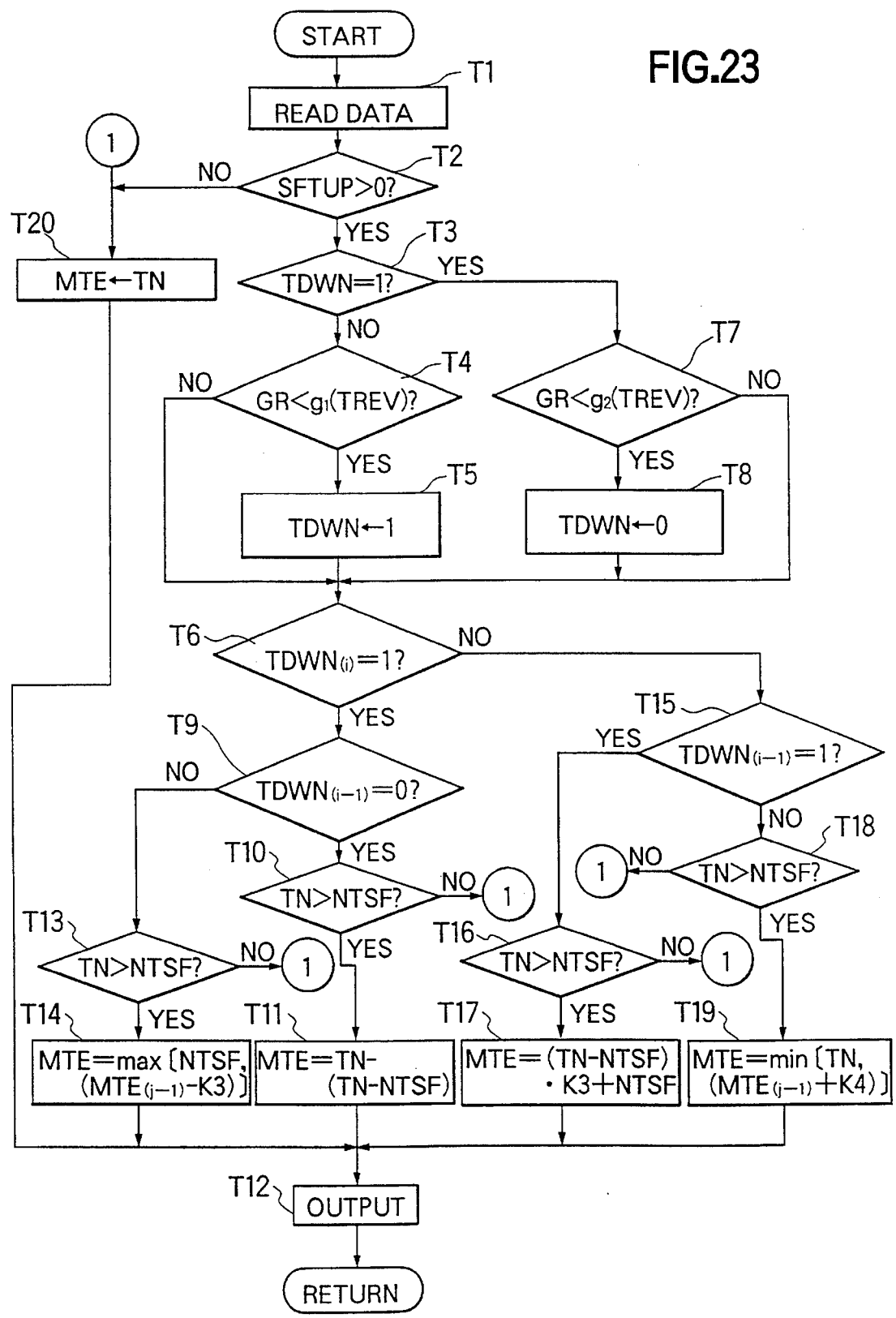
FIG. 23 is a flow chart of a torque down control similar to FIG. 6.

FIG. 22 shows a flow chart of a line pressure control similar to FIG. 5 of the former embodiment.

In the illustrated embodiment, where the control unit C judges that it is possible to carry out the torque down control in the step S5, the control unit C judges whether or not the lock up clutch is off in a step S6. If the control unit C finds that the lock up clutch 26 is OFF, or if the torque converter is in the converter condition, the control unit C calculates the target shift time TSFT based on the map with regard to the turbine torque TT, the speed change amount DTREV and shift stage GEAR as the parameters.

In the step S6, if the control unit C finds that the lock up clutch 26 is engaged to establish a lock-up condition, the control unit C calculates the target shift time TSFT based on the map for torque down control during the lock-up condition with regard to the turbine torque TT, the speed change amount DTREV and shift stage GEAR as the parameters. Then, the target angular acceleration w' is calculated in accordance with the formula (6).

In step 9, the control unit C judges whether or not the shift up flag SFTUP is changed from 0 to 1 in the precedent cycle. If the judgment is Yes, the control unit C sets a target torque NTSF during the shift operation in accordance with a map with regard to the turbine torque TT and the angular acceleration w' as parameters in step S10. Then, the control unit C judges whether or not the engine torque TN is greater than the target torque NTSF. If the judgment is No in the step S10, the control unit C further judges whether or not the engine torque TN is greater than the target torque NTSF during the shift operation in step S11. In short, the control unit sets the target torque NTSF based on the input member torque or turbine torque TT, angular acceleration w' only when the shift operation is detected. In step S11, where the control unit C finds that the engine torque TN is not greater than the target torque NTSF during the shift operation, the control unit proceeds to the step S12 and sets the engine torque TN as the target torque during the shift operation. Then, the control unit sets the input torque hydraulic pressure PT in step S13. The rest of the procedures of the FIG. 22 are the same as FIG. 5 of the former embodiment and thus, will be omitted from a detailed explanation The torque down control in the shift up operation will be explained taking reference with FIG. 23. Basically, the procedures of the torque down control are common with the former embodiment as explained in connection with the flowchart of FIG. 6. Therefore, the same procedures as the embodiment explained in connection with FIG. 6 will be omitted from the detailed explanation.

The procedures from the step T1 to T8 are the same as those in FIG. 6. In the step T6, the control unit C judges whether or not the torque down flag TDWN(i) of the current cycle is 1. If the judgment is Yes, or if the torque down flag TDWN(i) of the current cycle is 1, the control unit C further judges whether or not the torque down flag TDWN(i−1) in the precedent cycle is 0. This means that the control unit C judges whether or not the value of the torque down flag TDWN has been changed just before through the procedures in steps T6 and T9. After the control unit C finds that the torque down flag TDWN(i−1) in the precedent cycle is 0 in the step T9, the control unit C carries out the step T10 and judges whether or not the engine torque TN is greater than the target torque NTSF. If the judgment is Yes, the control unit C calculates the target engine torque MTE in accordance with the formula (8). In the step T9, the judgment is No, the control unit C proceeds to a step T13 and make the same judgment as the step 10. If the judgment is Yes, the control unit calculates the target engine torque MTE in accordance with the formula (9). The control unit C judges in steps T16 and T18 whether or not the engine torque TN is greater than the target torque NTSF after the judgment of a step T15.

In the illustrated embodiment, if the engine torque TN is not greater than the target torque NTSF, a step T20 is carried out and the engine torque TN is set as the target engine torque MTE.

Therefore, if the engine torque TN is smaller than the target torque NTSF, the engine torque control will not be executed.

Figure 24:
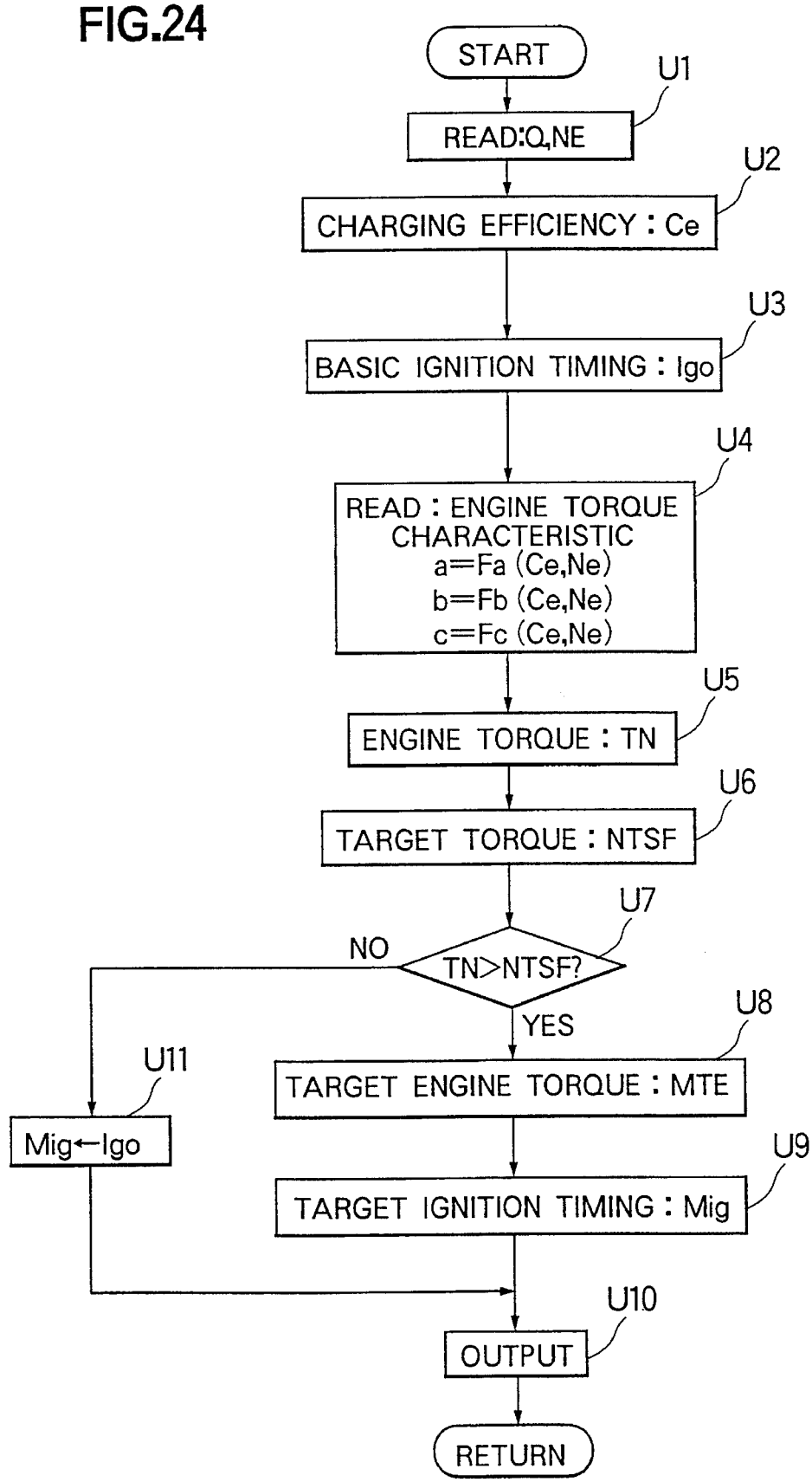
FIG. 24 is a flow chart of an engine torque control in connection with the embodiment of FIG. 22.

Hereinafter, there will be explained an engine torque control taking reference with a flowchart of FIG. 24.

Figure 25:
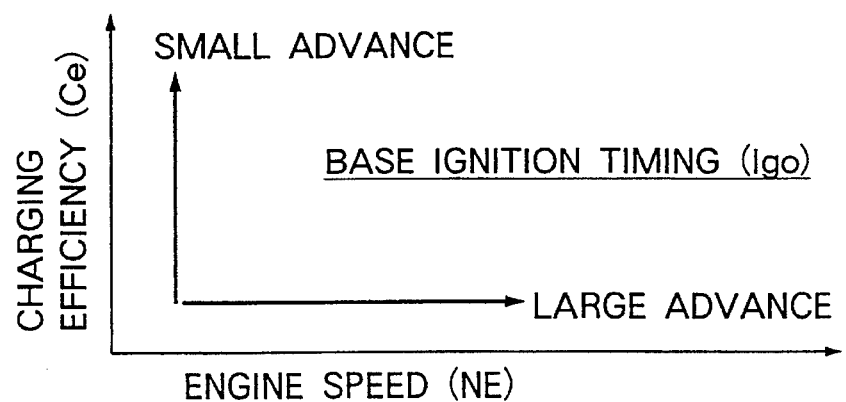
FIG. 25 is a view showing what is like a map providing a relationship between the air charging efficiency and the engine speed which is used in the engine torque control as shown in FIG. 24 in the form of flowchart.

The control unit C reads in the intake air amount Q, engine speed NE, and calculates a charging efficiency Ce of the intake air based thereon. The control unit C reads in a basic ignition timing Igo based on a map of a basic ignition timing as shown in FIG. 25 in light of the engine speed NE and the charging efficiency Ce. As the engine speed NE is increased, the advance of timing is increased. As the charging efficiency Ce is increased, the advance of the timing is decreased. The control unit C reads an engine torque characteristic in step U4 and calculates the engine torque TN.

Figure 26:
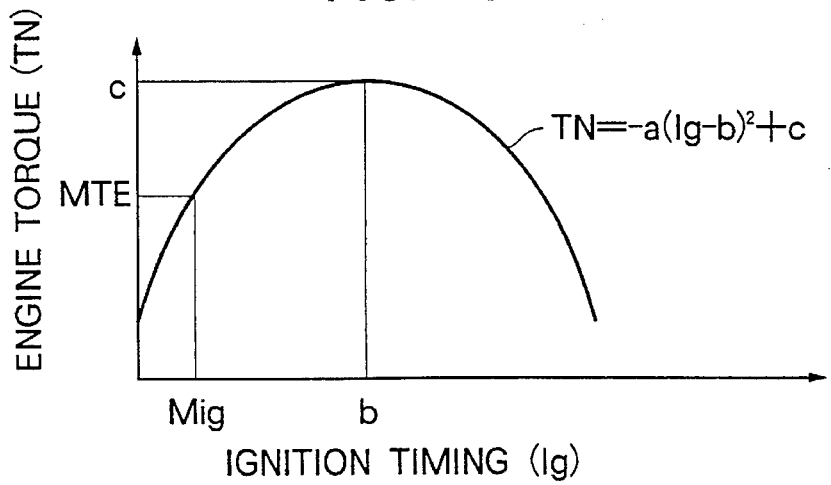
FIG. 26 is a graphical representation of a characteristic of an engine torque to an ignition timing.
Figure 27:
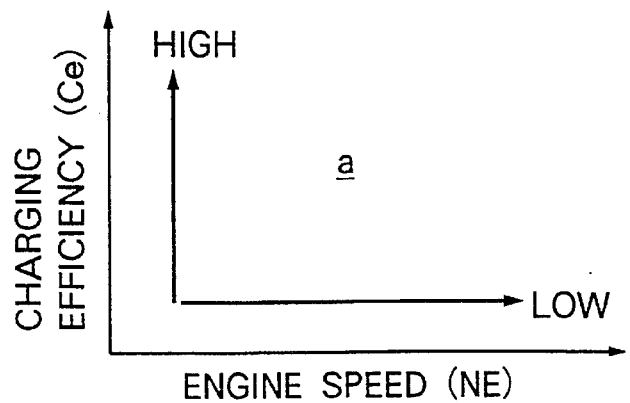
FIGS. 27, 28 and 29 are views respectively showing what is like a map for obtaining a coefficient of an approximate formula for the engine torque.
Figure 28:
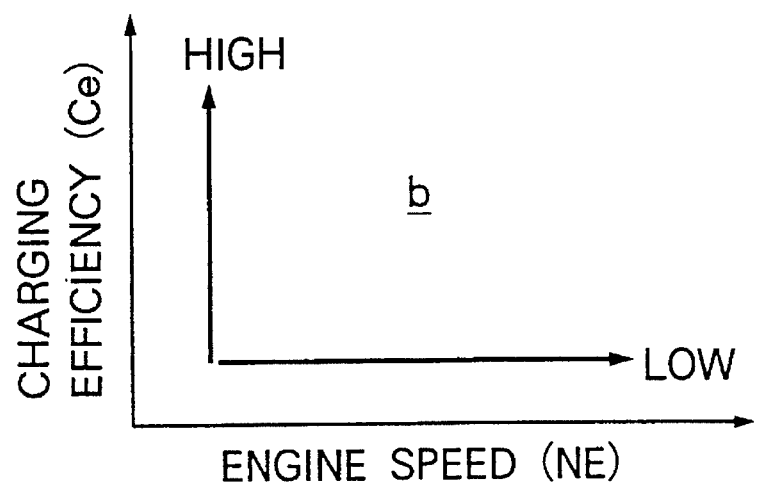
Figure 29:
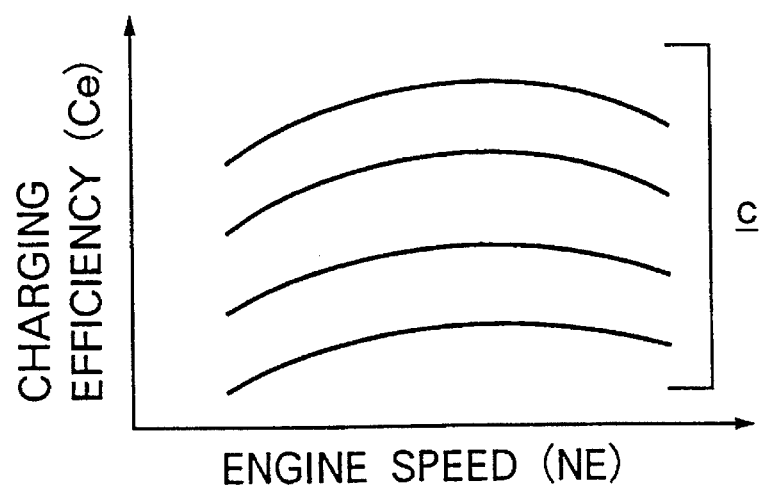

Namely, the engine torque TN under a normal operation can be approximated by a secondary curve as shown in FIG. 26 and expressed by the following formula:

$$TN = -a(Ig-b)^2 + c \qquad (12)$$

Wherein a, b, and c are coefficients changing in accordance with the operating condition of the engine. Those coefficients a, b, and c are provided by maps as shown in FIGS. 27, 28 and 29 based on the engine speed NE and the charging efficiency Ce as parameters. A function Fa (NE, Ce) providing the coefficient a is decreased as the engine speed NE is increased, and is increased as the charging efficiency Ce is increased as shown in FIG. 25. A function Fb (NE, Ce) providing the coefficient b is increased as the engine speed NE is increased and decreased as the charging efficiency Ce is increased as shown in FIG. 26. A function Fc (NE, Ce) providing the coefficient c has a similar characteristic as the engine output torque.

The control unit C calculates the engine torque TN introducing the coefficients a, b, c obtained through the maps respectively and the basic ignition timing Igo which reads out from the map to the above formula (12). The engine torque TN obtained through the above procedure is used as a basis for the various procedures.

The control unit C proceeds to the step U6 to read in the target torque NTSF after the calculation of the engine torque TN. Then, the control unit C judges whether or not the engine torque TN is greater than the target torque NTSF in step U7. Where the engine torque TN is greater than the target torque NTSF, the control unit C reads in the target engine torque and thereafter calculates the target ignition timing by the following formula (13) which is obtained by modifying the formula (12).

$$Mig = b - [(c - MTE)/a]^{1/2} \qquad (13)$$

Then, the control unit executes a step U10 and produces an ignition control signal in accordance with the target ignition timing Mig.

On the other hand, if the control unit finds that the engine torque TN is not greater than the target torque NTSF, the control unit sets the target ignition timing Mig at the basic ignition timing Igo in step U11 and produces the ignition timing control signal according to the target ignition timing signal Mig in step U10.

Figure 30:
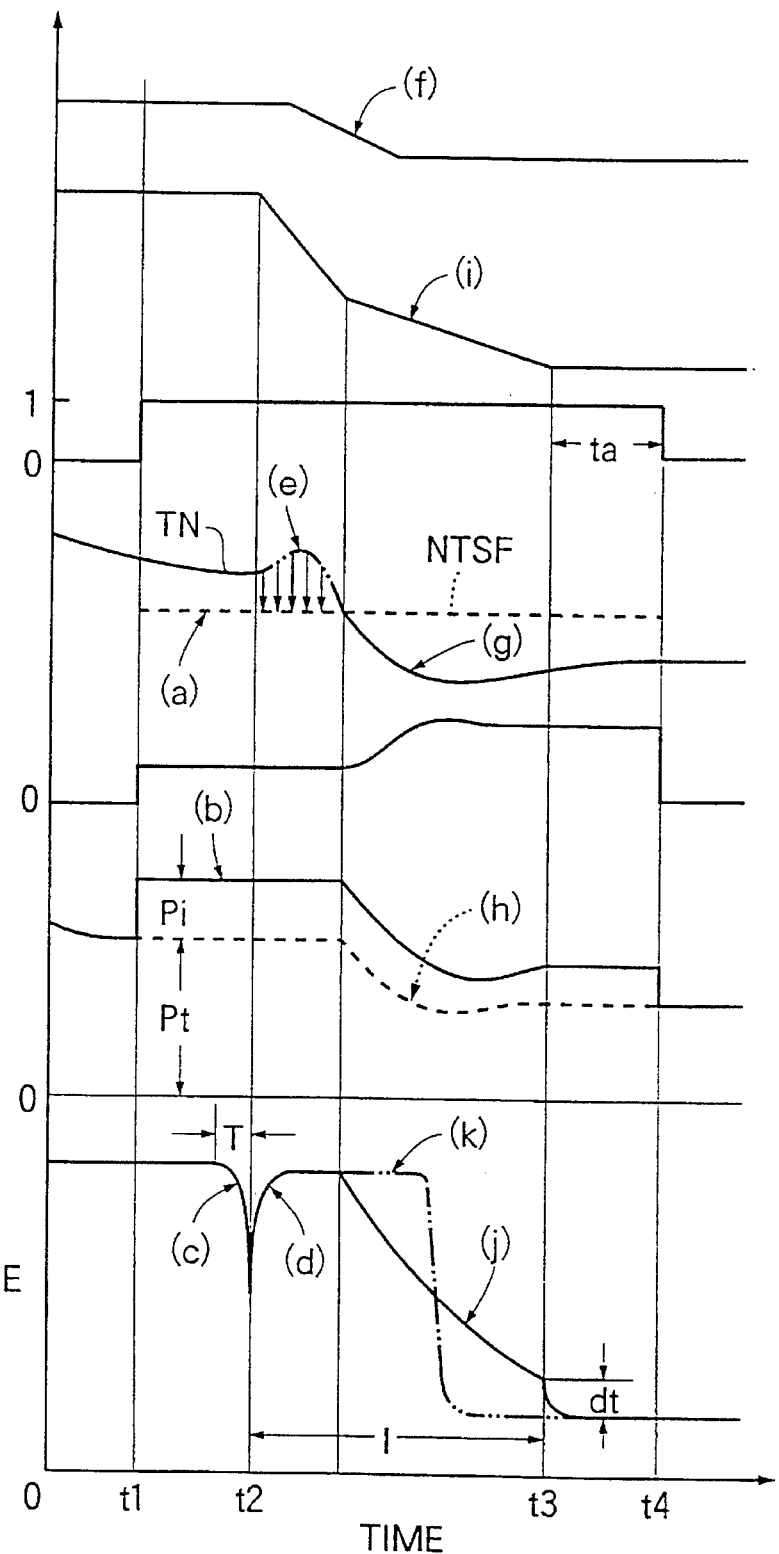
FIG. 30 is a time chart showing changes of variables involved in the shift operation.

In operation, when the shift up operation is carried out in the case where the torque down control is allowed, as shown in FIG. 30, the shift up flag SFTUP is set at 1 at a time t1 and concurrently the target torque NTSF is set as shown by a reference (a). Further, the target line pressure P is set based on the input torque hydraulic pressure set based on the target torque NTSF and the inertia torque hydraulic pressure PI obtained corresponding to the target shift time TSFT as shown by a reference (b). The output shaft torque is temporarily dropped as shown by a reference (c) (torque phase T). Thereafter, the output torque is started to be increased (inertia phase I) as shown by a reference (d) from a time t2 when the engine torque is reduced so as to accomplish the target torque NTSF during the shift operation as shown by a reference (e).

Meanwhile, occasionally, the throttle opening θ is reduced as shown by a reference (f), for example, by returning the acceleration pedal. In this case, the intake air amount Q is reduced and thus, the engine torque TN, which is calculated using the intake air amount Q as a parameter, is also reduced. In an operating condition where the engine torque TN is set at a value smaller than the target torque NTSF as shown by a reference (g), torque down control is canceled. Therefore, the input torque pressure PT is set based on the above engine torque TN smaller than the target torque NTSF. As a result, the input torque hydraulic pressure PT is reduced corresponding to the reduction of the engine torque TN as shown by a reference (h).

In the illustrated embodiment, the target shift time TSFT is extended as the engine torque TN is reduced. As the engine torque TN is reduced, the inertial torque hydraulic pressure PI is also reduced. Therefore, the reduction rate of the turbine speed TREV is reduced as shown by a reference (i) after the engine torque TN is reduced below the target torque NTSF. As a result, the shift operation is made slow than the initial stage of the shift operation. Consequently, the output torque of the output shaft torque in a later stage of the inertia phase I is reduced gradually as shown by a reference (j) so that the torque difference dT from the end of the inertia phase (time t3) to a torque level at a shift stage after the shift operation is dramatically reduced compared with a torque change in which the engine torque is controlled to the target torque NTSF throughout the inertial phase (see a reference (k)).

The shift up flag SFTUP is reset at a time t4 when a predetermined time period ta goes on from the time t3.

Hereinafter, a further embodiment will be explained.

Figure 31:
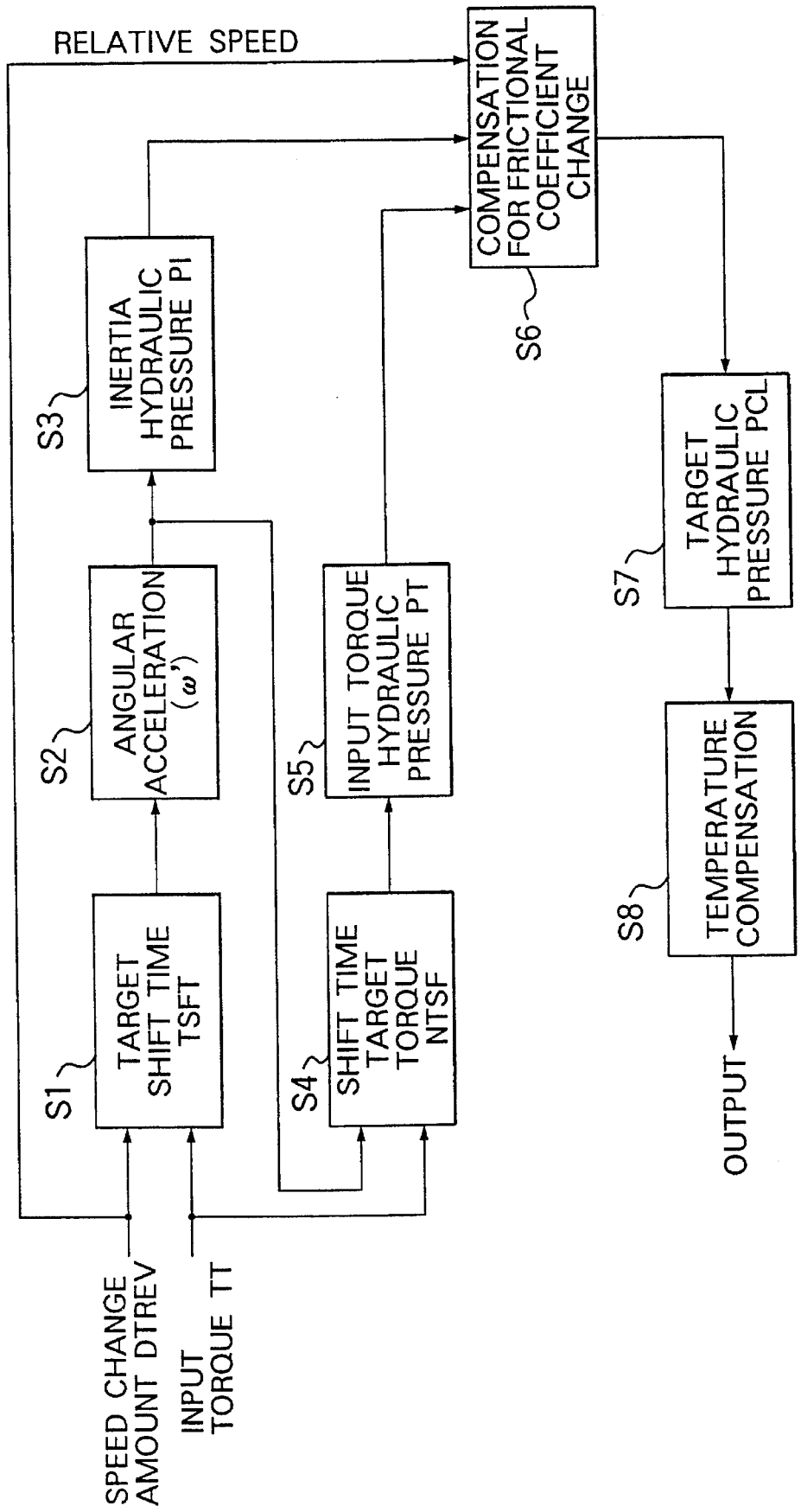
FIG. 31 is a block chart of the line hydraulic pressure control in accordance with further embodiment of the present invention.
Figure 32:
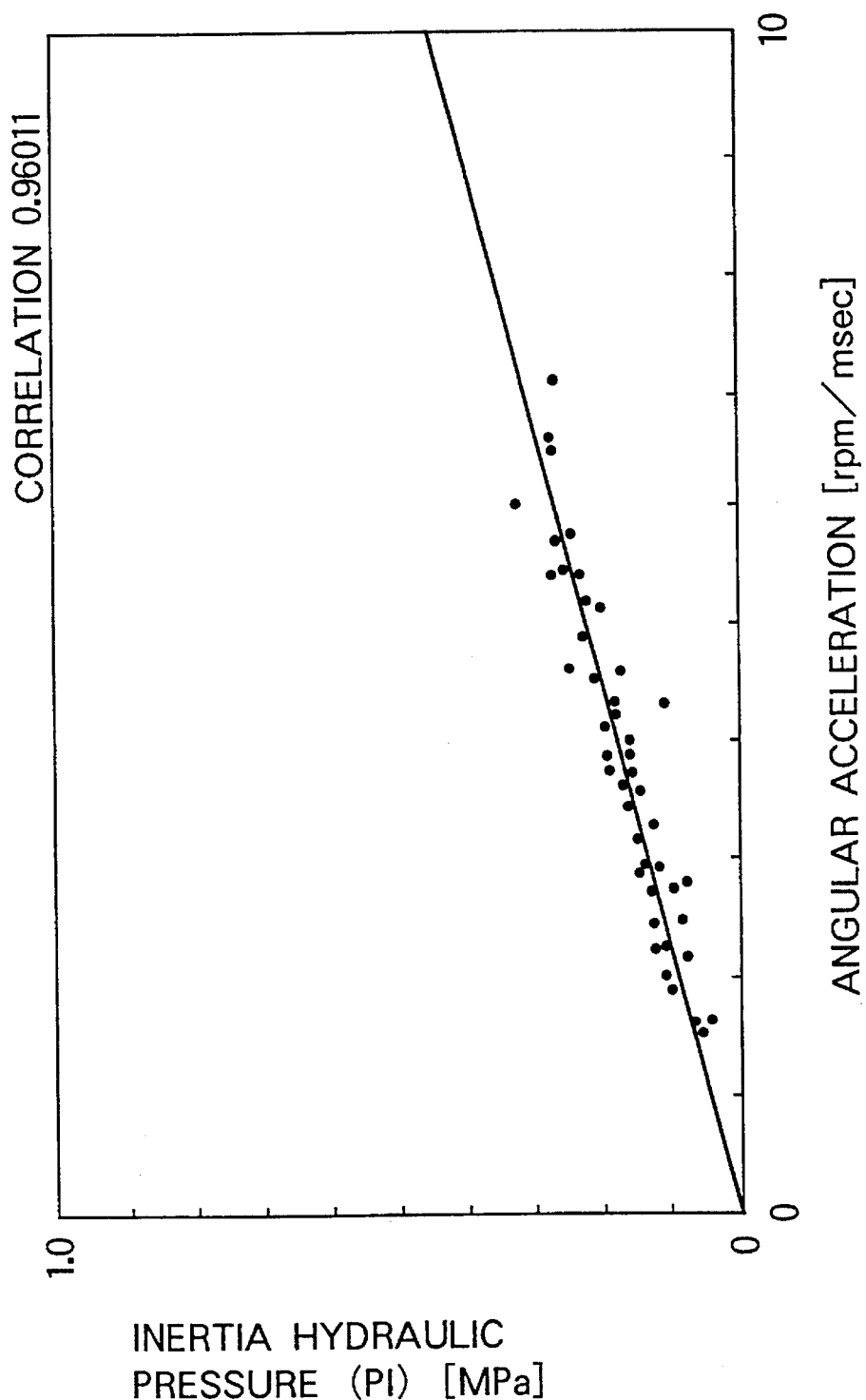
FIG. 32 is a graphical representation showing a correlation between the inertia hydraulic pressure and angular acceleration obtained through a conventional method.
Figure 33:
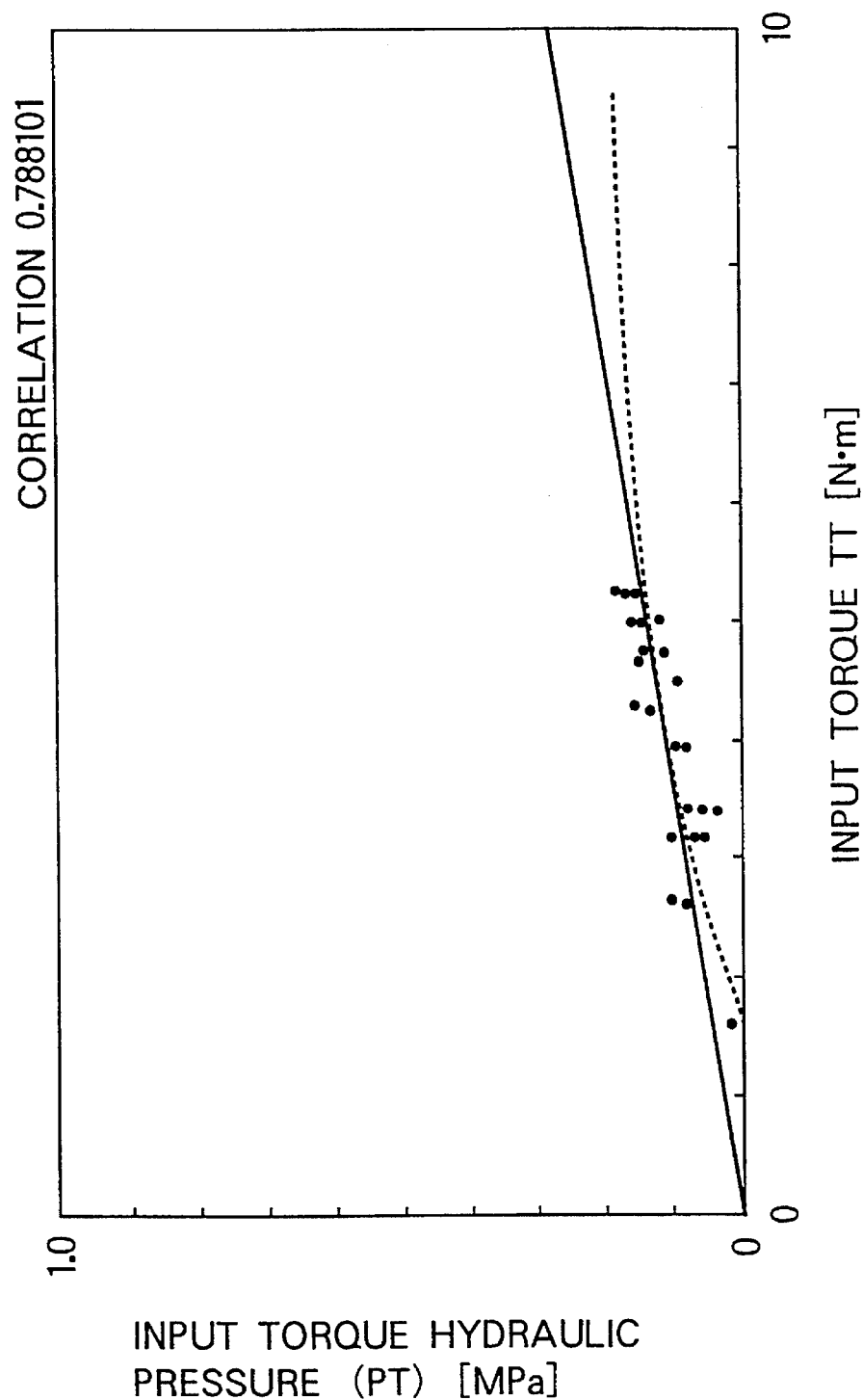
FIG. 33 is a graphical representation showing a correlation between the input torque hydraulic pressure and input torque obtained through a conventional method.

As shown in FIG. 31, the basic logic of the line pressure control in which the torque down is made during the shift operation is as follows.

In order to make a shift operation, a target shift time TSFT is set based on an amount of the change of the input member speed DTRE of the shift speed mechanism 6 through the shift operation, in other words, the speed difference of the turbine speed TREV before the shift operation and the turbine speed TREV after the shift operation, and the input torque TT introduced to the shift speed mechanism 6 or the torque of the turbine shaft 5 (block S1).

The input torque TT is calculated by means of a well known method based on an engine load (main throttle opening), engine speed, ignition timing and the like wherein it is assumed that the torque down is not produced.

The angular acceleration w' of the turbine speed TREV of the shift speed mechanism 6 is calculated based on the target shift time TSFT and the speed change amount DTREV (block S2).

Next, an inertia hydraulic PI is set to cope with the moment force N based on the angular acceleration w' obtained in the block S2 (block S3).

The control unit C sets the target torque during the shift operation NTSG taking account of the torque down based on the angular acceleration w' in addition to the setting of the inertia hydraulic pressure PI (block S4). The target torque NTSF during the shift operation is stored in the control unit C in the form of a map with regard to the target torque NTSF and the angular acceleration w'.

The control unit C determines the input torque hydraulic pressure PT based on the target torque which is the engine torque taking account of the torque down (block S5). The input torque hydraulic pressure PT is a line pressure for obtaining an engaging pressure of the frictional element which provides the input torque TT introduced to the frictional element of the shift speed mechanism 6. The input torque hydraulic pressure PT is stored in the control unit C in the form of a table with regard to the target torque NTSF during the shift operation.

The hydraulic pressure for the shift operation is calculated based on the inertia hydraulic pressure PI, torque hydraulic pressure PT and speed change amount or the relative speed of the clutch taking account of the frictional coefficient μ of the frictional element (block S6 and block S7). In particular, the sum of the inertia hydraulic pressure and the torque hydraulic pressure is compensated by the frictional coefficient in accordance with the speed change amount (block S6) to obtain the hydraulic pressure for the shift operation (block S7). In this case, the frictional coefficient can be inferred based on a surface pressure and/or a speed difference between a driving member and a driven member of the frictional element.

The hydraulic pressure obtained is subjected to a compensation based on the hydraulic temperature to obtain a final target line pressure. The actual line pressure is controlled to accomplish the target line pressure (block S8).

According to the illustrated embodiment, the target line pressure is set taking account of the frictional element to which the hydraulic pressure is introduced in the shift operation so that the shift time can be precisely controlled to the target shift time.

In the blocks S6 and S7, the frictional coefficient is inferred based on a surface pressure and/or a speed difference between a driving member and a driven member of the frictional element. The hydraulic pressure for the shift operation is determined based on the frictional coefficient. The hydraulic pressure P for the shift operation can be determined based on the input torque TT and the angular acceleration w' which take account of the frictional coefficient.

The surface pressure is proportional to the hydraulic pressure P for the shift operation so that the relative speed of the frictional element can be represented by the angular acceleration w' during the shift operation. Thus, the frictional element μ can be expressed by the following formula (14) as a function of the hydraulic pressure P and w'.

$$\mu = g(P, w') \qquad (14)$$

The frictional force $F = P*A*\mu$ can be expressed in the m of a function h of the input torque TT and the angular acceleration w' as independent variables as follows.

$$P*A*\mu = h(TT, w') \qquad (15)$$

wherein A is an area of the frictionally engaging surface of the frictional element (constant).

From the formulas (14) and (15), the following formula can be obtained.

$$g(P,w')*A*P = h(TT, w') \qquad (16)$$

Theoretically, the following formula (17) for obtaining the hydraulic pressure P can be derived from the formula (16) since the independent variables are P, TT and w' in the formula (16).

$$P = f(TT, w') \qquad (17)$$

However, it is impossible to derive mathematically the hydraulic pressure P. Therefore, the hydraulic pressure P can be expressed by a polynomial expression as the input torque Tt and angular acceleration w' by means of Maclaurin series. The polynomial expression as a primary approximating formula is as follows.

$$P = a1*TT + a2*w' + a3*TT*w' + a4 \qquad (18)$$

The a1, a2, a3 and a4 are constant which can be determined in accordance with the frictional coefficient of the frictional element and determined by an experiment or analysis.

The polynomial expression as a secondary approximating formula is as follows.

$$P = b1*TT + b2*w' + b3*TT*w' + b4*TT^2 + b5*w'^2 + b6*TT^2 + b7*TT*w'^2 + b8*TT^2w'^2 + b9 \qquad (19)$$

The b1, b2, b3, b4, b5, b6, b7, b8 and b9 are constant which can be determined in accordance with the frictional coefficient of the frictional element and determined by an experiment or analysis.

According to the experiment by the inventors of the present invention, the formula (18) can be substantially the same as the following formula (20).

$$P = c1*TT + c2*w' + c3TT^2 + c4 \qquad (20)$$

The c1, c2, c3 and c4 are constant which can be determined in accordance with the frictional coefficient of the frictional element and determined by an experiment or analysis.

Assuming that the formula (20) is appropriate, a plurality of data of the actual hydraulic pressure P, angular acceleration w and input torque TT are measured when the shift time is accorded with the target value so as to determine the constant c1, c2, c3 and c4. Then, the actual hydraulic pressure is controlled to accomplish the target pressure P so that the shift time can be controlled to the target value.

The present inventors determined the constants c1, c2, c3 and c4 so as to provide the minimum error by means of the double regression method using the actual data which are actually detected in order to determine the optimized values of the constants c1, c2, c3 and c4.

According to the formula (20), the portion of the total hydraulic pressure corresponding to the angular acceleration w' is proportional to the inertia hydraulic pressure PI and the portion corresponding to the input torque TT is proportional to the input torque TT. The portion corresponding to the value $TT^2$ are proportional to the value $TT^2$.

Figure 34:
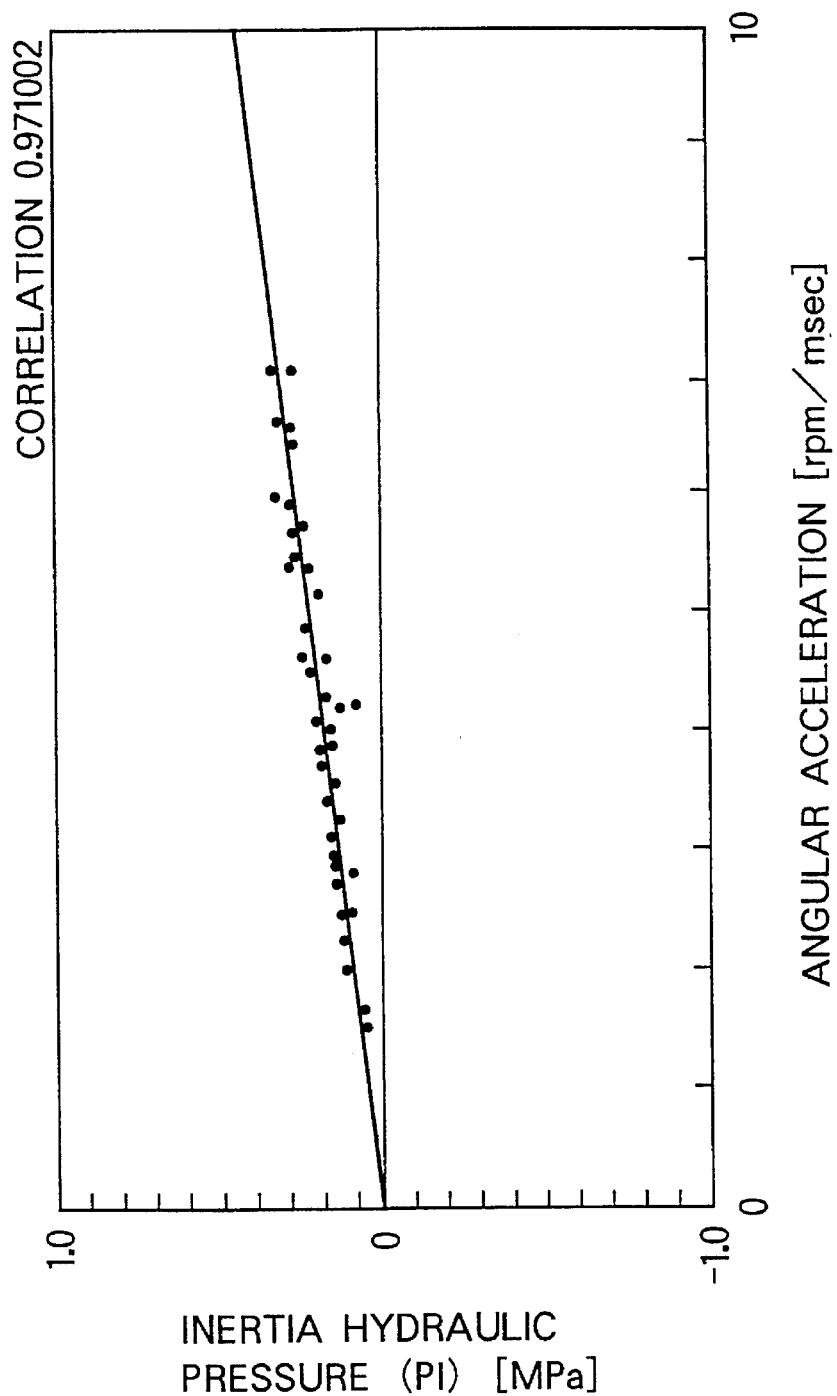
FIG. 34 is a graphical representation showing a correlation between the inertia hydraulic pressure and angular acceleration in accordance with the present invention.
Figure 36:
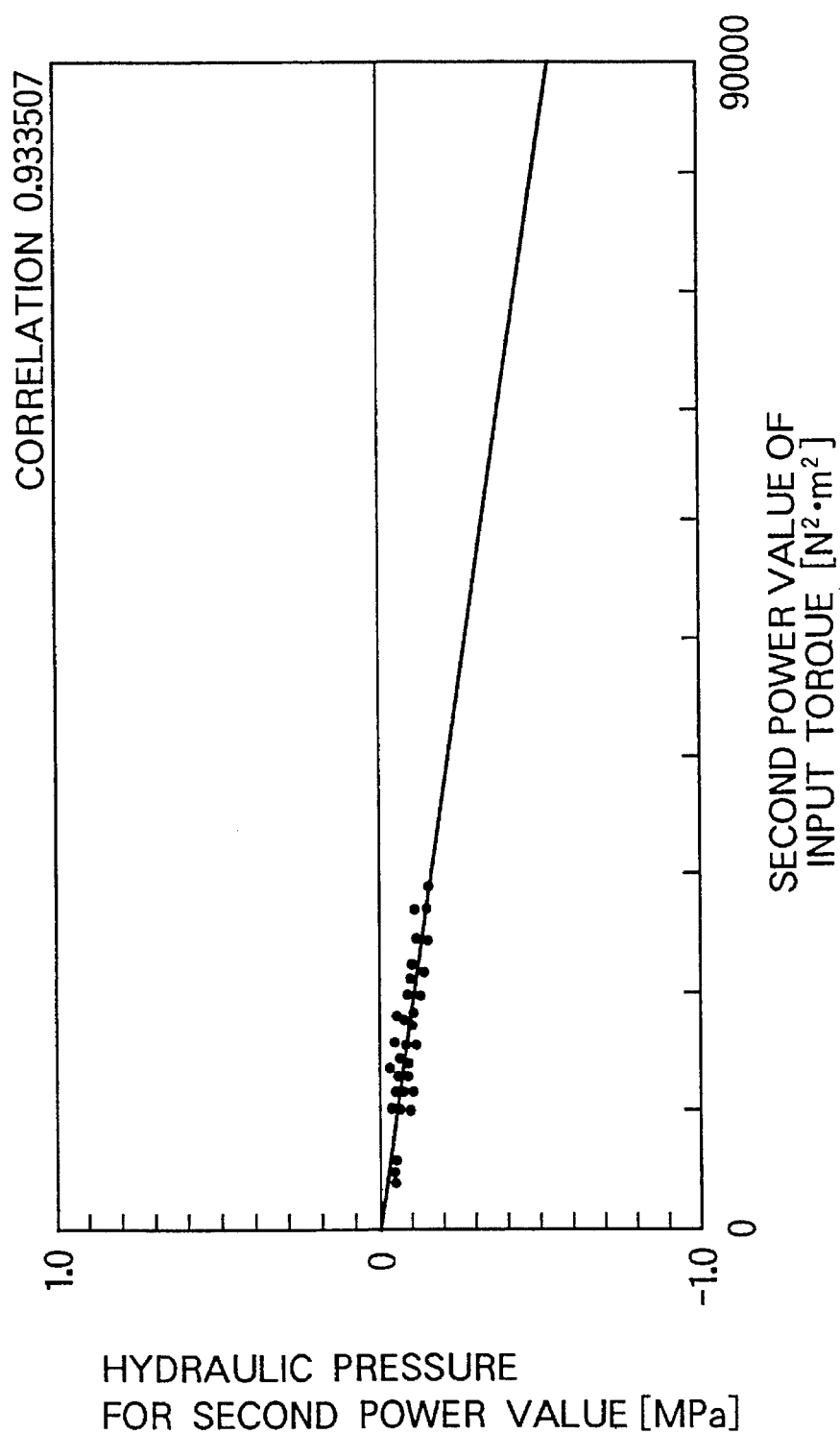
FIG. 36 is a graphical presentation showing a correlation between the hydraulic pressure for second power value and second power value of the input torque in accordance with the present invention.

FIGS. 34, 34 and 36 show relationships between the angular acceleration and the inertia hydraulic pressure, between the input torque and torque hydraulic pressure, and the portion hydraulic pressure corresponding to the second power value of input torque TT and the second power value of the input torque TT respectively.

Figure 35:
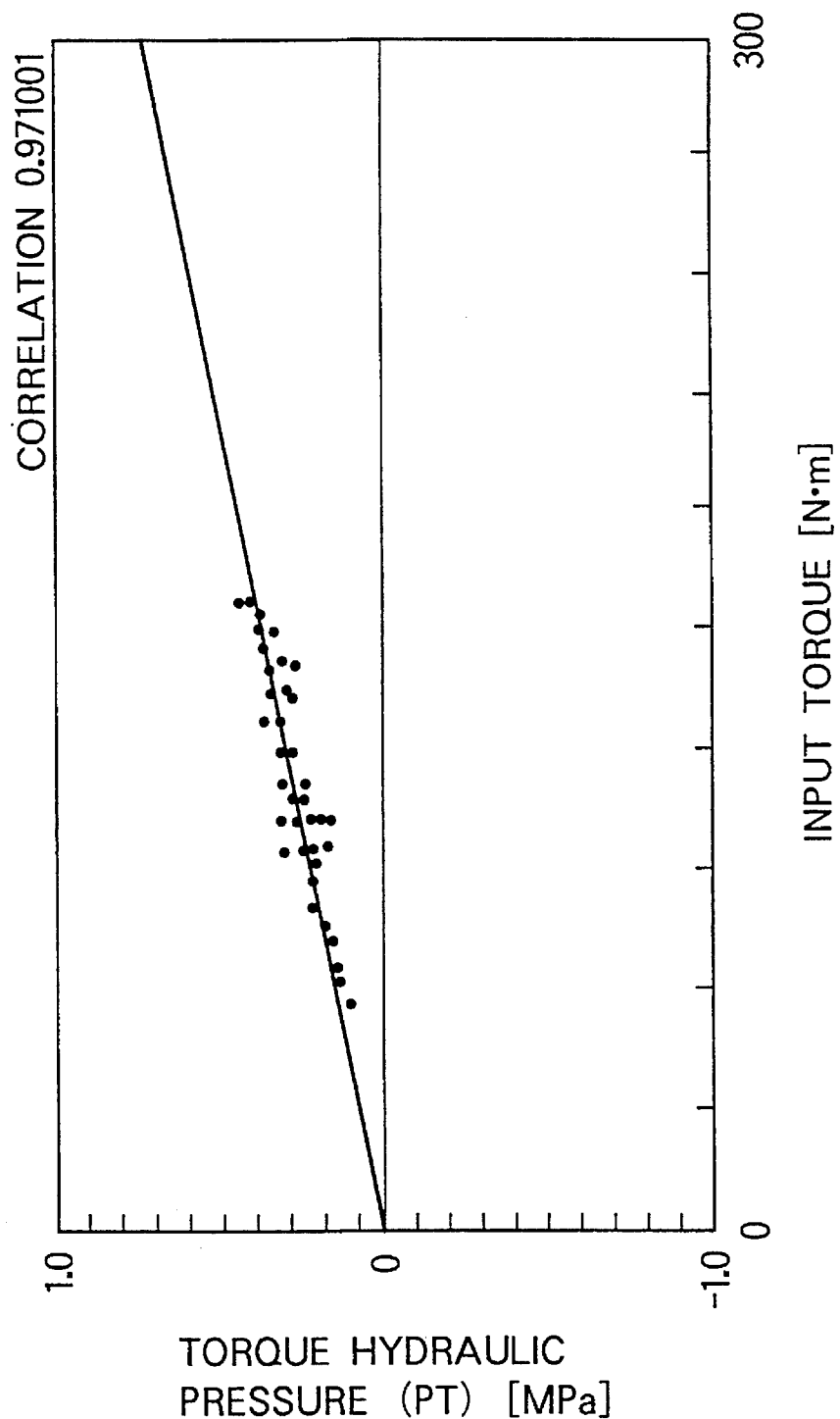
FIG. 35 is a graphical presentation showing a correlation between the input torque hydraulic pressure and input torque in accordance with the present invention.

As seen from the FIGS. 34, 35 and 36, the correlation coefficient between the inertia hydraulic pressure and the angular acceleration is 0.971002, the coefficient between the torque hydraulic pressure and the input torque is 0.971002 and the coefficient of the second power hydraulic pressure and the second power value of the input torque TT is 0.933507. Thus, their relationships are substantially linear. Thus, it will be understood that the formula (20) is very accurate so that the if the target hydraulic pressure is determined based on the formula (20), the shift time can be controlled to the target value accurately.

Figure 37:
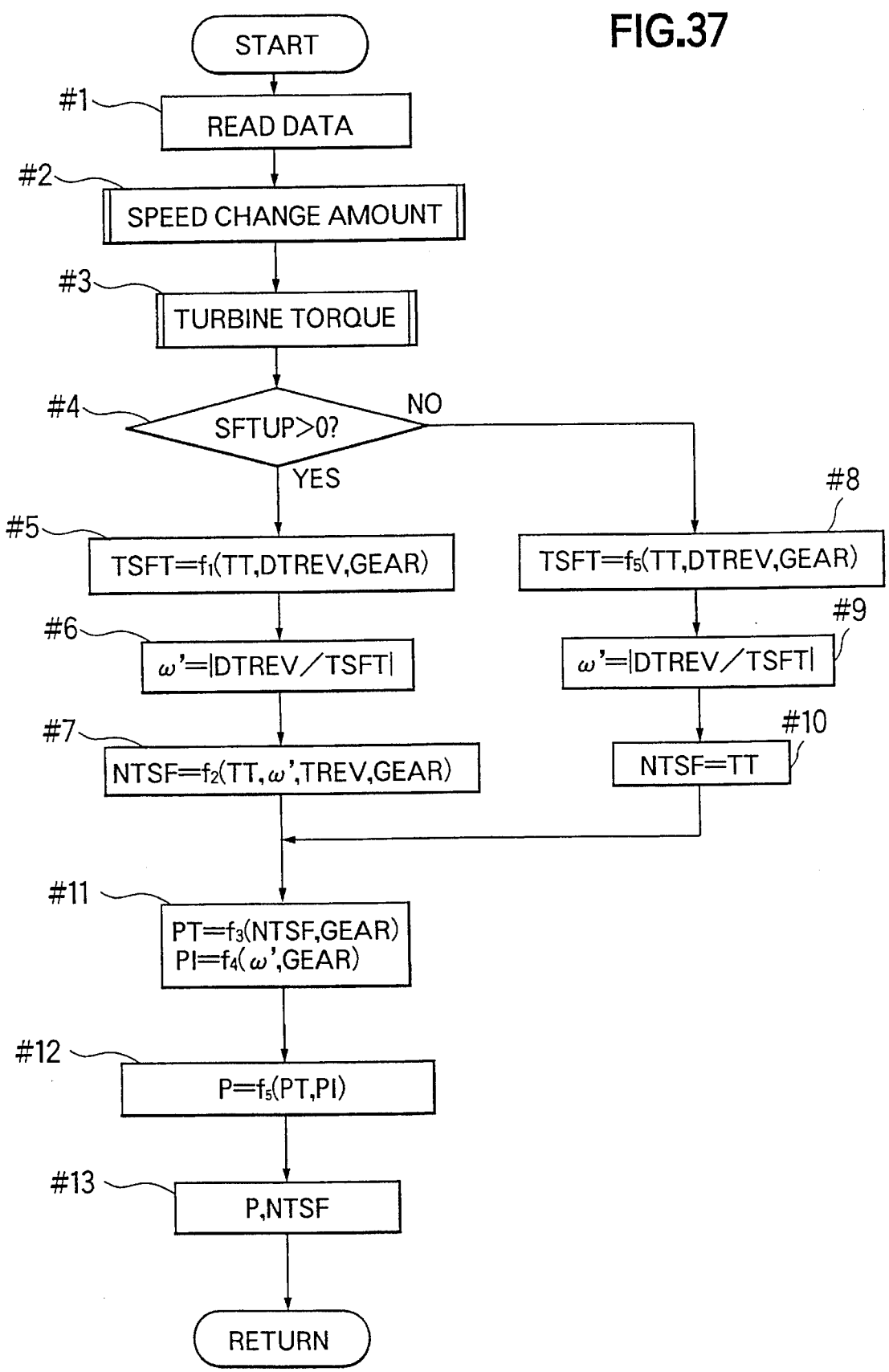
FIG. 37 is a flowchart of a line pressure control similar to FIG. 5 but showing still another embodiment.

As shown in FIG. 37, there is shown a program of a line pressure control executed by the control unit C. The control unit reads in various signals such as the turbine speed TREV (input member speed of the shift speed mechanism 6), the engine speed NE, engine torque TN(torque of the crank shaft 3), the output shaft speed SREV and hydraulic temperature THOIL in step #1.

Specifically, in the step #2, the inferred rotation speed change DTREV is calculated according to a formula (21)

and the input torque TT is calculated by a formula (22) in the step #3.

$$DTREV = TREV - SREV*RG \qquad (21)$$

$$TT = k*(TREV/NE)*TN \qquad (22)$$

In formula (22), k(TREV/NE) denotes a torque ratio corresponds to the speed ratio (TREV/NE) of the torque converter 4.

Figure 38:
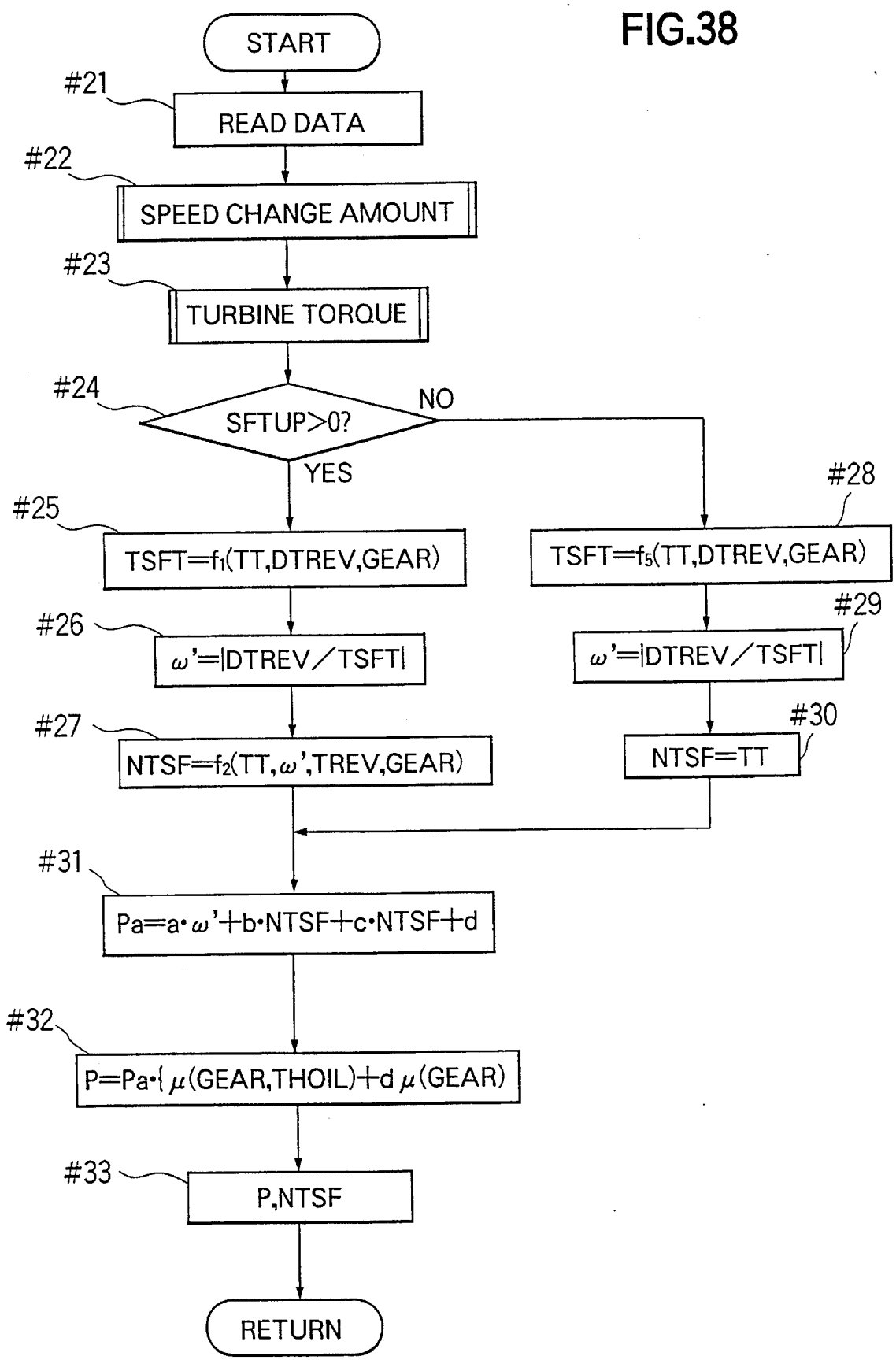
FIG. 38 is a flowchart of a line pressure control similar to FIG. 5 but showing still another embodiment.

Next, it is judged if the torque down can be made without deteriorating the operation of the engine 1 in step #4. The steps #21–#30 of FIG. 38 are substantially the same procedures as the steps #1–#11 of FIG. 4 so that the detailed explanation will be omitted.

In the illustrated embodiment, the target hydraulic pressure Pa based on the target angular acceleration w' and the target input torque NTSF in accordance with the following formula (21).

$$Pa = a*w' + b*NTSF + c*NTSF^2 + d \qquad (23)$$

In formula (23), the coefficients a, b, c and d can be determined in accordance with the coefficient of the frictional element by an experiment. The formula (23), which is a simplified secondary approximating formula is substantially the same formula as the formula (20). Thus, the constants a, b, c and d correspond to the constant c1, c2, c3 and c4 of the formula (20).

In step #32, the target hydraulic pressure Pa is compensated by the hydraulic pressure and learning compensation to determine the final target line pressure P for the same reason as that explained in connection with FIG. 4.

Although the present invention has been explained with reference to a specific, preferred embodiment, one of ordinary skill in the art will recognize that modifications and improvements can be made while remaining within the scope and spirit of the present invention. The scope of the present invention is determined solely by the appended claims.

What is claimed is:

1. A hydraulic control system for a power train comprising;

a shift speed mechanism;

a frictional element hydraulically controlled for switching a shift characteristic of the shift speed mechanism;

a hydraulic control mechanism for controlling a hydraulic pressure of the frictional element;

a target shift time setting device for setting a target shift time based on an input speed difference of the shift speed mechanism through the shift operation and an input torque introduced to the shift speed mechanism;

an angular acceleration calculator for calculating an angular acceleration of an input member of the shift speed mechanism based on the target shift time obtained through the target shift time setting device and the input speed change of the shift speed mechanism through the shift operation;

an inertia hydraulic pressure setting device for setting an inertia hydraulic pressure for coping with a moment force due to a moment of inertia of a power transmitting system to the shift speed mechanism based on the angular acceleration of the input member of the shift speed mechanism obtained through the angular acceleration calculator;

an input torque pressure setting device for setting an input torque hydraulic pressure corresponding to the input torque introduced to the shift speed mechanism based on the input torque; and, a target pressure setting device for setting a final target hydraulic pressure for the hydraulic control mechanism as a working hydraulic pressure based on the inertia hydraulic pressure set by the inertia pressure setting device and the input torque hydraulic pressure set by the input torque pressure setting device.

2. A hydraulic control system as recited in claim 1 further comprising a target torque setting device for setting a target input torque to the shift speed mechanism during the shift operation based on the angular acceleration of the input member calculated by the angular acceleration calculator and the input torque of the shift speed mechanism;

the input torque pressure setting device setting the input torque hydraulic pressure based on the target torque set by the target torque setting device.

3. A hydraulic control system as recited in claim 1 wherein the target shift time setting device sets the target shift time by searching a target shift time map based on the input speed change to the shift speed mechanism through the shift operation and the input torque introduced to the shift speed mechanism and;

wherein two kinds of target shift time maps, one used for a hydraulic control where a torque down is produced in the shift speed mechanism in the shift operation and the other used for a hydraulic control where the torque down is not produced in the shift speed mechanism in the shift operation, are separately provided.

4. A hydraulic control system as recited in claim 2 further comprising;

an engine torque control device for controlling the input torque to the target input torque set by the target torque setting device; and, the target pressure setting device setting the working hydraulic pressure of the hydraulic control mechanism during shift operation based on a smaller value of an actual input torque and the target input torque.

5. A hydraulic control system as recited in claim 4 wherein the hydraulic pressure setting device sets the working hydraulic pressure at a value corresponding to the target input torque when the actual input torque is greater than the target input torque during the shift operation, and sets at a value corresponding to the actual input torque when the target input torque is greater than the actual input torque.

6. A hydraulic control system as recited in claim 4 wherein the input torque is determined by a parameter including at least an intake air amount of an engine.

7. A hydraulic control system as recited in claim 4 wherein the engine torque control device controls to fix the engine torque at a predetermined value corresponding to the target input torque when the actual input torque is greater than the target input torque in an inertial phase of the shift operation.

8. A hydraulic control system as recited in claim 1 wherein the speed change of the input member of the shift speed mechanism through the shift operation when the shift operation is completed within the target shift time is used as a factor representing an inertia torque which acts on the frictional element during the shift operation.

9. A hydraulic control system as recited in claim 8 further comprising a target shift time change device for changing the target shift time in accordance with the actual input torque during the shift operation; and, an inertia hydraulic pressure change device for reducing the inertia hydraulic pressure as the target shift time is increased.

10. A hydraulic control system as recited in claim 2 further comprising;

a frictional coefficient inference device for inferring a frictional coefficient of the frictional element during the shift operation, the frictional element being subjected to a hydraulic control by the hydraulic control mechanism during the shift operation;

the target pressure setting device setting the working hydraulic pressure based on the input torque, a speed change rate of the shift speed mechanism during the shift operation and an inferred frictional coefficient inferred by the frictional coefficient inferring device.

11. A hydraulic control system as recited in claim 2 wherein the frictional coefficient inference device infers the frictional coefficient based on at least one of a surface pressure and a relative speed difference between a driving member and driven member of the frictional element.

12. A hydraulic control system as recited in claim 11 wherein the target pressure setting device sets the target hydraulic pressure in accordance with a primary approximate formula including the input torque to the shift speed mechanism and input speed change rate of the shift speed mechanism during the shift operation as independent variables and a constant obtainable from the frictional coefficient of the frictional element.

13. A hydraulic control system as recited in claim 12 wherein the primary approximate formula is as follow;

$$P = a1*TT + a2*w' + a3*Tt*w' + a4$$

wherein

P: target hydraulic pressure,

TT: input torque to the shift speed mechanism, w': rotation speed change rate of an input member of the shift speed mechanism, a1, a2, a3 and a4: constants obtainable from the frictional coefficient of the frictional element.

14. A hydraulic control system as recited in claim 11 wherein the target pressure setting device sets the target hydraulic pressure in accordance with a secondary approximate formula including the input torque to the shift speed mechanism and input speed change rate of the shift speed mechanism during the shift operation as independent variables and a constant obtainable from the frictional coefficient of the frictional element.

15. A hydraulic control system as recited in claim 14 wherein the secondary approximate formula is as follow;

$$P = b1*TT + b2*w' + b3*Tt*w' + b4*TT^2 + b5*w'^2 + b6*TT^2*w' + b7*TT*w'^2 + b8*w'^2 + b9$$

wherein

P: target hydraulic pressure,

TT: input torque to the shift speed mechanism, w': rotation speed change rate of an input member of the shift speed mechanism, b1, b2, b3, b4, b5, b6, b7, b8 and b9: constants obtainable from the frictional coefficient of the frictional element.

* * * * *